US011402958B2

(12) United States Patent
Kim et al.

(10) Patent No.: US 11,402,958 B2
(45) Date of Patent: Aug. 2, 2022

(54) ELECTRONIC DEVICE

(71) Applicant: SAMSUNG DISPLAY CO., LTD., Yongin-si (KR)

(72) Inventors: Miyoung Kim, Hwaseong-si (KR); Yong-Hwan Park, Hwaseong-si (KR); Kwanghyeok Kim, Cheonan-si (KR); Soyeon Park, Yongin-si (KR); Sanghyun Jun, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/139,615

(22) Filed: Dec. 31, 2020

(65) Prior Publication Data

US 2021/0373708 A1     Dec. 2, 2021

(30) Foreign Application Priority Data

May 27, 2020 (KR) .................. 10-2020-0063700

(51) Int. Cl.
  *G06F 3/044*  (2006.01)
  *G06F 3/041*  (2006.01)

(52) U.S. Cl.
  CPC .......... *G06F 3/0445* (2019.05); *G06F 3/0412* (2013.01); *G06F 2203/04112* (2013.01)

(58) Field of Classification Search
  CPC ... G06F 2203/04112; G06F 3/041–412; G06F 3/044–0448; G06F 2203/04111; G06F 2203/04107
  See application file for complete search history.

(56) References Cited

U.S. PATENT DOCUMENTS

| 9,547,402 | B2 | 1/2017 | An | |
|---|---|---|---|---|
| 10,481,729 | B2 | 11/2019 | Park | |
| 2016/0103516 | A1* | 4/2016 | An | H01L 27/323 345/174 |
| 2016/0104756 | A1* | 4/2016 | Lee | H01L 27/326 257/40 |
| 2018/0159065 | A1* | 6/2018 | Kim | H01L 27/3248 |
| 2019/0034010 | A1* | 1/2019 | Lee | G06F 3/0412 |
| 2019/0258338 | A1 | 8/2019 | Park | |
| 2020/0026375 | A1 | 1/2020 | Park et al. | |
| 2020/0119113 | A1* | 4/2020 | Lee | H01L 51/5012 |

FOREIGN PATENT DOCUMENTS

| CN | 110660836 | 1/2020 |
|---|---|---|
| KR | 10-2016-0043577 | 4/2016 |
| KR | 10-2019-0025798 | 3/2019 |
| KR | 10-2019-0101517 | 9/2019 |

* cited by examiner

*Primary Examiner* — Sanjiv D. Patel
(74) *Attorney, Agent, or Firm* — F. Chau & Associates, LLC

(57) ABSTRACT

An electronic device includes a base layer, a first sensing pattern disposed on the base layer and including a plurality of first mesh lines, a second sensing pattern disposed on the base layer and spaced apart from the first sensing pattern, a first sensing line electrically connected to the first sensing pattern, and a second sensing line electrically connected to the second sensing pattern. Each of the first mesh lines includes at least one of a first end and a second end having a shape different from a shape of the first end, the first end faces the second sensing pattern, and the second end is spaced apart from the second sensing pattern.

26 Claims, 17 Drawing Sheets

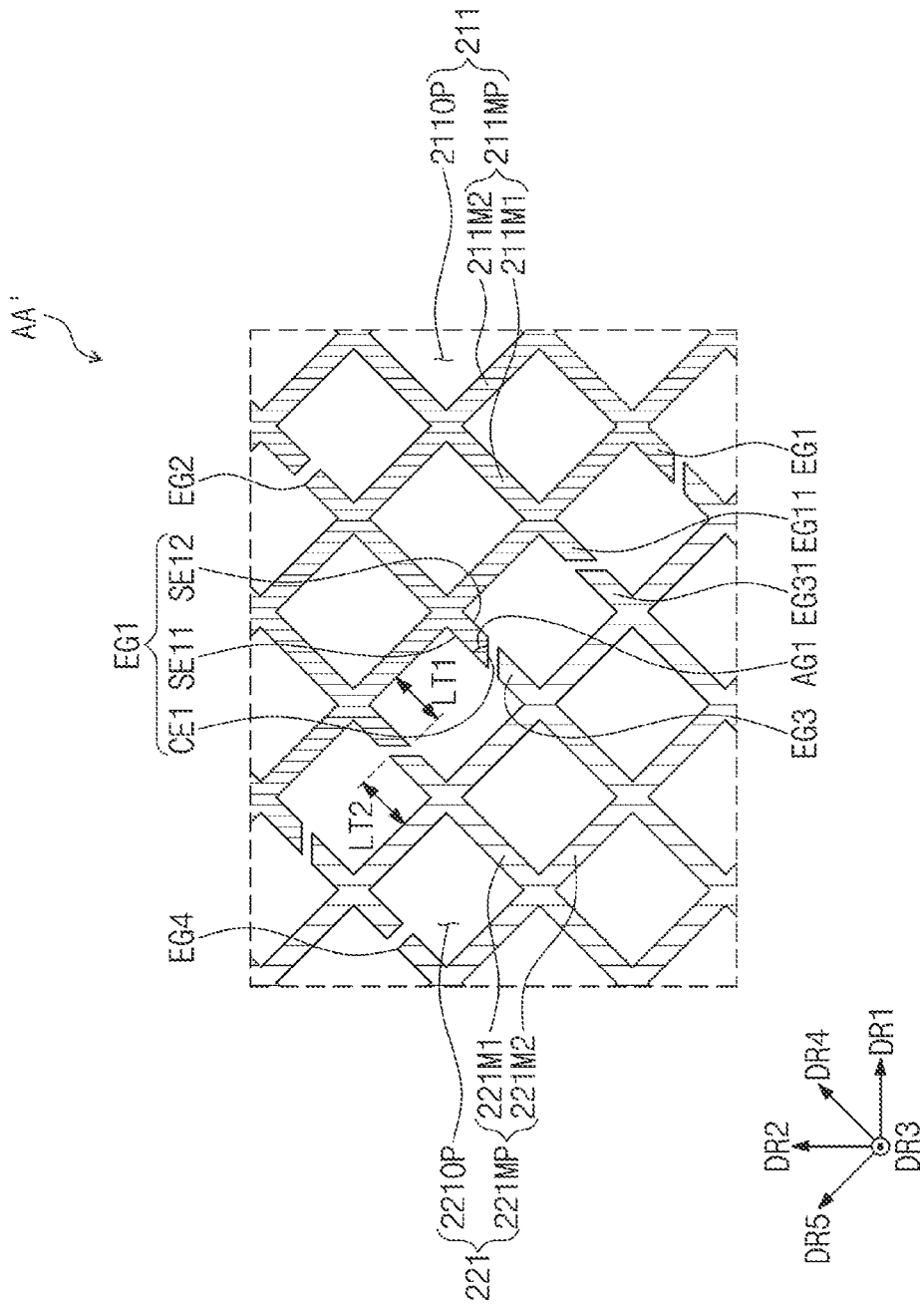

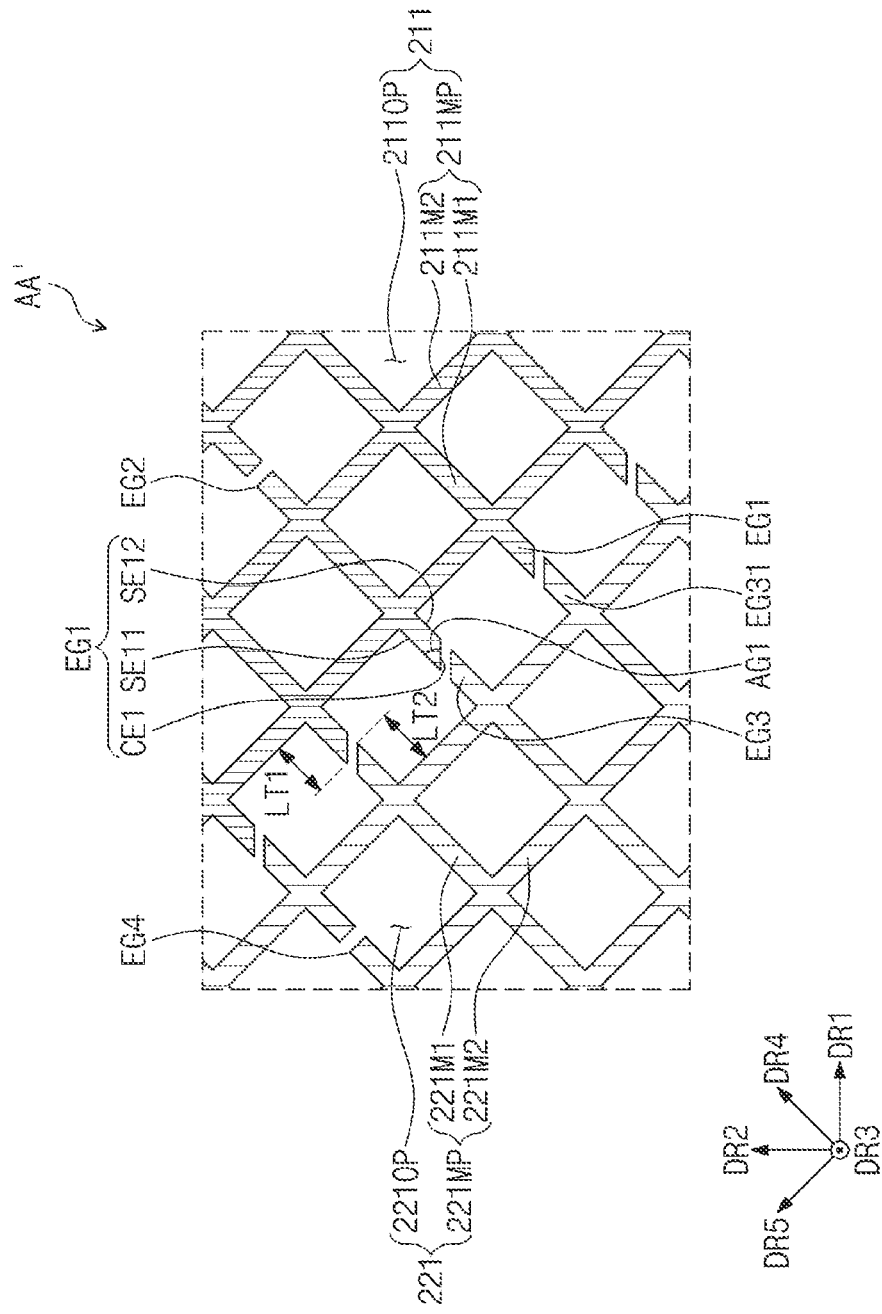

ELECTRONIC DEVICE

CROSS-REFERENCE TO RELATED APPLICATION

This application claims priority under 35 U.S.C. § 119 to Korean Patent Application No. 10-2020-0063700, filed on May 27, 2020, the disclosure of which is hereby incorporated by reference in its entirety.

TECHNICAL FIELD

Example embodiments of the present disclosure relate to an electronic device capable of sensing an external input.

DISCUSSION OF RELATED ART

An electronic device may be activated in response to electrical signals. Such an electronic device may include a display layer that displays images and a sensor layer that senses an input applied thereto from an outside source, and a variety of electrode patterns to be activated in response to the electrical signals.

SUMMARY

Example embodiments of the present disclosure provide an electronic device which may have improved repairability, and/or improved display quality.

Example embodiments of the present disclosure provide an electronic device including a base layer, a first sensing pattern disposed on the base layer and including a plurality of first mesh lines, a second sensing pattern disposed on the base layer and spaced apart from the first sensing pattern, a first sensing line electrically connected to the first sensing pattern, and a second sensing line electrically connected to the second sensing pattern. Each of the plurality of first mesh lines includes at least one of a first end and a second end having a shape different from a shape of the first end, the first end directly faces the second sensing pattern, and the second end is spaced apart from the second sensing pattern.

In an example embodiment, the electronic device further includes a dummy pattern disposed on the base layer and disposed between the first sensing pattern and the second sensing pattern, and the second end is spaced apart from the second sensing pattern with the dummy pattern interposed therebetween.

In an example embodiment, the second end of one first mesh line among the plurality of first mesh lines directly faces another first mesh line among the plurality of first mesh lines.

In an example embodiment, the first end includes a plurality of first side edges extending substantially parallel to each other and a first connection edge connecting the plurality of first side edges, the second end includes a plurality of second side edges extending substantially parallel to each other and a second connection edge connecting the plurality of second side edges, and the first connection edge has a length different from a length of the second connection edge.

In an example embodiment, an angle between one first side edge among the plurality of first side edges and the first connection edge is different from an angle between one second side edge among the plurality of second side edges and the second connection edge.

In an example embodiment, one edge of the first connection edge and the second connection edge is a substantially straight line, and the other edge of the first connection edge and the second connection edge is a curved line.

In an example embodiment, one edge of the first connection edge and the second connection edge includes at least two substantially straight lines, and the other edge of the first connection edge and the second connection edge includes one substantially straight line or one curved line.

In an example embodiment, the second sensing pattern includes a mesh portion, the plurality of first mesh lines extends in a first direction, the mesh portion extends in a second direction crossing the first direction, and the mesh portion faces the first end.

In an example embodiment, the second sensing pattern includes a plurality of second mesh lines extending in a same direction as the plurality of first mesh lines, each of the plurality of second mesh lines includes at least one of a third end and a fourth end having a shape different from a shape of the third end, the third end faces the first end, and the fourth end is spaced apart from the first sensing pattern.

In an example embodiment, the first end and the third end have a substantially same shape as each other.

In an example embodiment, the third end has a shape corresponding to a shape of the first end.

In an example embodiment, the plurality of first mesh lines have widths that are the same as each other.

In an example embodiment, the electronic device further includes a display layer disposed under the base layer and a light emitting area defined therein, and the first sensing pattern includes an opening defined therein and overlapping the light emitting area.

In an example embodiment, the first sensing pattern includes a first mesh portion defining the opening, a second mesh portion spaced apart from the first mesh portion, a third mesh portion connected to the first mesh portion and the second mesh portion, and a fourth mesh portion spaced apart from the third mesh portion and connected to the first and second mesh portions. The first, second, third, and fourth mesh portions are spaced apart from the light emitting area when viewed in a thickness direction of the base layer.

In an example embodiment, the light emitting area includes a first light emitting portion and a second light emitting portion concaved from the first light emitting portion in a direction away from the base layer, and a width of a mesh portion adjacent to the second light emitting portion among the first, second, third, and fourth mesh portions is greater than a width of a mesh portion adjacent to the first light emitting portion among the first, second, third, and fourth mesh portions.

In an example embodiment, the light emitting area includes a first light emitting portion and a second light emitting portion inclined from the first light emitting portion in a direction away from the base layer, and when viewed in the thickness direction of the base layer, a distance between a mesh portion adjacent to the second light emitting portion among the first, second, third, and fourth mesh portions and the light emitting area is smaller than a distance between a mesh portion adjacent to the first light emitting portion among the first, second, third, and fourth mesh portions and the light emitting area.

In an example embodiment, the light emitting area includes a first light emitting area and a second light emitting area emitting a light having a same color as a color of a light emitted from the first light emitting area, the opening includes a first opening surrounding the first light emitting area and a second opening surrounding the second light emitting area, and when viewed in a thickness direction of the base layer, a position of the first light emitting area with respect to the first opening is different from a position of the second light emitting area with respect to the second opening.

In an example embodiment, the first sensing pattern further includes a plurality of mesh portions that defines the first opening, and a width of a portion of the plurality of mesh portions is different from a width of another portion of the plurality of mesh portions.

Example embodiments of the present disclosure provide an electronic device including a first sensing pattern including a first mesh pattern in which a disconnection portion is defined, and a second sensing pattern spaced apart from the first sensing pattern and including a second mesh pattern. A first end of the first mesh pattern facing the second sensing pattern has a shape different from a shape of a second end of the first mesh pattern defining the disconnection portion.

In an example embodiment, the electronic device further includes a dummy pattern disposed between the first sensing pattern and the second sensing pattern, and a third end of the first mesh pattern facing the dummy pattern has a shape different from the shape of the first end.

Example embodiments of the present disclosure provide an electronic device including a display layer including a light emitting area including a first light emitting portion and a second light emitting portion inclined from the first light emitting portion, and a sensing pattern disposed on the display layer, provided with an opening defined therein to correspond to the light emitting area, and including a plurality of mesh portions surrounding the opening. When viewed in a thickness direction of the display layer, a distance between a first mesh portion adjacent to the first light emitting portion among the plurality of mesh portions and the light emitting area is greater than a distance between a second mesh portion adjacent to the second light emitting portion among the plurality of mesh portions and the light emitting area.

In an example embodiment, the first mesh portion has a width greater than a width of the second mesh portion.

In an example embodiment, the sensing pattern further includes a first mesh line having a first end and a second mesh line having a second end having a shape different from the first end.

Example embodiments of the present disclosure provide an electronic device including a display layer including a first light emitting area and a second light emitting area emitting a light having a same color as a color of a light emitted from the first light emitting area and a sensing pattern disposed on the display layer and provided with a first opening defined therein to overlap the first light emitting area, and a second opening defined therein to overlap the second light emitting area. When viewed in a thickness direction of the display layer, a position of the first light emitting area with respect to the first opening is different from a position of the second light emitting area with respect to the second opening.

In an example embodiment, the sensing pattern includes a plurality of mesh portions that defines the first opening, and a width of a portion of the plurality of mesh portions is different from a width of another portion of the plurality of mesh portions.

In an example embodiment, the sensing pattern includes a first mesh line including a first end and a second mesh line including a second end having a shape different from the first end.

According to example embodiments of the present disclosure as described above, the mesh line, which defines the disconnection portion, has a shape divided into a portion that is manifested as defects and a portion that is not manifested as defects when the disconnection portion is short-circuited, and the portions are implemented to have different shapes from each other. Accordingly, when the disconnection occurs in a specific area, it is determined whether the specific area requires the repair process to be performed. That is, according to example embodiments, the repair process is performed only in an area that requires the repair process, and thus, a manufacturing yield of the electronic device may be increased, since the repair process is not performed in another area(s) that does not require the repair process. In addition, according to example embodiments, when the portion that does not require the repair process is short-circuited, the repair process is not performed.

In addition, as described above, according to example embodiments of the present disclosure, the width of the mesh portions of the mesh line or the distance between the mesh portions and the light emitting area are adjusted in a manner that may improve display quality. As the width of the mesh portions and the distance between the mesh portions and the light emitting area are adjusted to prevent, reduce or remove a phenomenon in which color coordinate distortion is generated in a specific direction, a white angle difference (WAD) characteristic may be improved, and an electronic device with improved display quality may be provided.

BRIEF DESCRIPTION OF THE DRAWINGS

The above and other features of the present disclosure will become readily apparent by describing in detail example embodiments thereof with reference to the accompanying drawings, in which:

FIG. 5A is an enlarged plan view showing an area AA' of FIG. 4 according to an example embodiment of the present disclosure.

FIG. 5B is an enlarged plan view showing an area AA' of FIG. 4 according to an example embodiment of the present disclosure.

DETAILED DESCRIPTION

Figure 1:
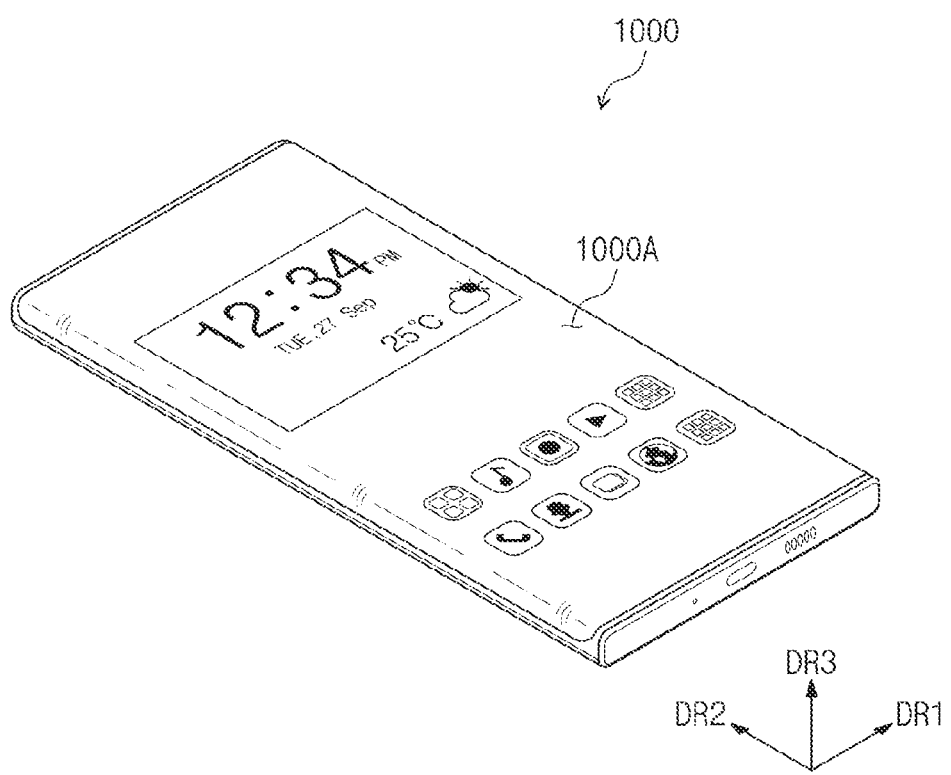
FIG. 1 is a perspective view showing an electronic device according to an example embodiment of the present disclosure.

Example embodiments of the present disclosure will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationship between components should be interpreted in a like fashion.

As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

As used herein, the singular forms, "a", "an" and "the" are intended to include the plural forms as well, unless the context clearly indicates otherwise.

Spatially relative terms, such as "beneath", "below", "lower", "above", "upper" etc., may be used herein for ease of description to describe one element or feature's relationship to another element(s) or feature(s) as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

It should be understood that descriptions of features or aspects within each example embodiment should typically be considered as available for other similar features or aspects in other example embodiments, unless the context clearly indicates otherwise.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art. It will be further understood that when a component is described as being substantially straight, the component may be exactly straight, or approximately straight within a measurement error as would be understood by a person having ordinary skill in the art. Further, it is to be understood that while parameters may be described herein as having "about" a certain value, according to example embodiments, the parameter may be exactly the certain value or approximately the certain value within a measurement error as would be understood by a person having ordinary skill in the art. Other uses of the terms "substantially" and "about" should be interpreted in a like fashion.

FIG. 1 is a perspective view showing an electronic device according to an example embodiment of the present disclosure.

Referring to FIG. 1, an electronic device 1000 may be a device activated in response to electrical signals. For example, the electronic device 1000 may be a mobile phone, a tablet computer, a car navigation unit, a game unit, or a wearable device. However, the electronic device 1000 is not limited thereto. Referring to FIG. 1, a mobile phone will be described as a representative example of the electronic device 1000.

The electronic device 1000 displays an image through an active area 1000A. The active area 1000A may include a plane defined by a first direction DR1 and a second direction DR2. The active area 1000A may further include curved surfaces bent from at least two sides of the plane. However, the shape of the active area 1000A is not limited thereto. For example, according to example embodiments, the active area 1000A may include only the plane, or the active area 1000A may further include two or more curved surfaces, e.g., four curved surfaces respectively bent from four sides of the plane.

A thickness direction of the electronic device 1000 may correspond to a third direction DR3 crossing the first direction DR1 and the second direction DR2. Accordingly, front (or upper) and rear (or lower) surfaces of each member of the electronic device 1000 may be defined with respect to the third direction DR3.

Figure 2A:
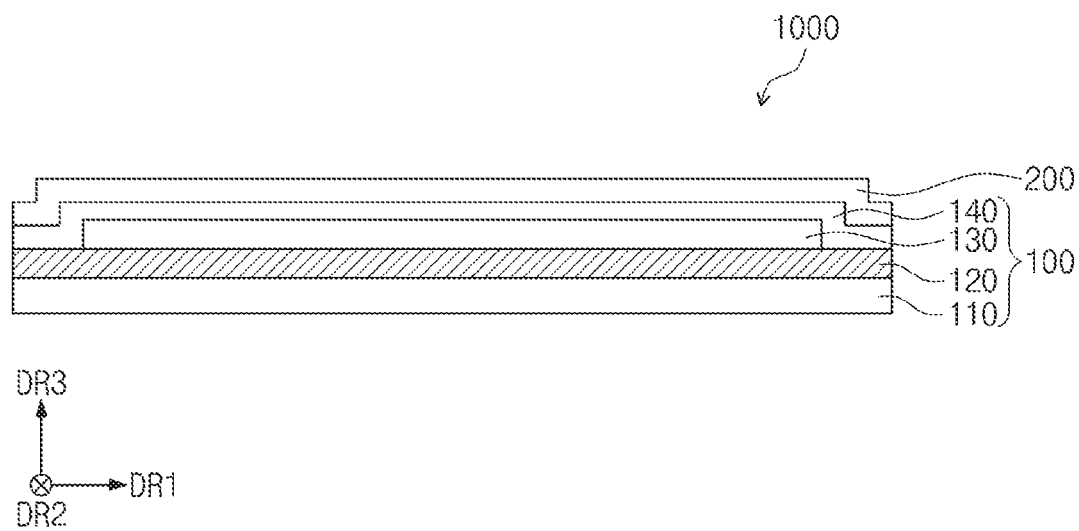
FIG. 2A is a cross-sectional view showing an electronic device according to an example embodiment of the present disclosure.

FIG. 2A is a cross-sectional view showing the electronic device 1000 according to an example embodiment of the present disclosure.

Referring to FIG. 2A, the electronic device 1000 may include a display layer 100 and a sensor layer 200.

The display layer 100 may have a configuration that substantially displays the image. The display layer 100 may be a light emitting type display layer. For example, the display layer 100 may be an organic light emitting display layer, a quantum dot light emitting display layer, or a micro-LED display layer. However, the display layer 100 is not limited thereto.

The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be, for example, a glass substrate, a metal substrate, or a polymer substrate. However, the base layer 110 is not limited thereto. For example, according to example embodiments, the base layer 110 may be an inorganic layer, an organic layer, or a composite material layer.

The base layer 110 may have a multi-layer structure. For example, the base layer 110 may have a three-layer structure of a synthetic resin layer, an adhesive layer, and a synthetic resin layer. The synthetic resin layer may include a polyimide-based resin. In addition, the synthetic resin layer may include, for example, at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In the present disclosure, the term "X-based resin" refers to a resin that includes a functional group of X.

The circuit layer 120 may be disposed on the base layer 110. The circuit layer 120 may include, for example, an insulating layer, a semiconductor pattern, a conductive pattern, and a signal line. An insulating layer, a semiconductor layer, and a conductive layer may be formed on the base layer 110 by, for example, a coating or depositing process. Then, the insulating layer, the semiconductor layer, and the conductive layer may be selectively patterned through several photolithography processes. The semiconductor pattern, the conductive pattern, and the signal line included in the circuit layer 120 may be formed.

The light emitting element layer 130 may be disposed on the circuit layer 120. The light emitting element layer 130 may include the light emitting element. For example, the light emitting element layer 130 may include an organic light emitting material, a quantum dot, a quantum rod, or a micro-LED.

The encapsulation layer 140 may be disposed on the light emitting element layer 130. The encapsulation layer 140 may include, for example, an inorganic layer, an organic layer, and an inorganic layer, which are sequentially stacked. However, the layers of the encapsulation layer 140 are not limited thereto.

The inorganic layers may protect the light emitting element layer 130 from, for example, moisture and oxygen, and the organic layer may protect the light emitting element layer 130 from a foreign substance such as, for example, dust particles. The inorganic layers may include, for example, a silicon nitride layer, a silicon oxynitride layer, a silicon oxide layer, a titanium oxide layer, or an aluminum oxide layer. The organic layer may include, for example, an acrylic-based organic layer. However, the present disclosure is not limited thereto.

The sensor layer 200 may be disposed on the display layer 100. The sensor layer 200 may sense an external input applied thereto from an outside source. For example, the external input may be a user's input. The user input may include a variety of external inputs such as, for example, a part of user's body, light, heat, a pen, or pressure.

The sensor layer 200 may be formed on the display layer 100 through successive processes. In this case, the sensor layer 200 may be described as being disposed directly on the display layer 100. In the present disclosure, the expression "the sensor layer 200 is disposed directly on the display layer 100" means that no intervening elements are present between the sensor layer 200 and the display layer 100. That is, in this case, according to example embodiments, a separate adhesive member is not disposed between the sensor layer 200 and the display layer 100.

Alternatively, in an example embodiment, the sensor layer 200 may be combined with the display layer 100 by an adhesive member. The adhesive member may include an ordinary adhesive.

Figure 2B:
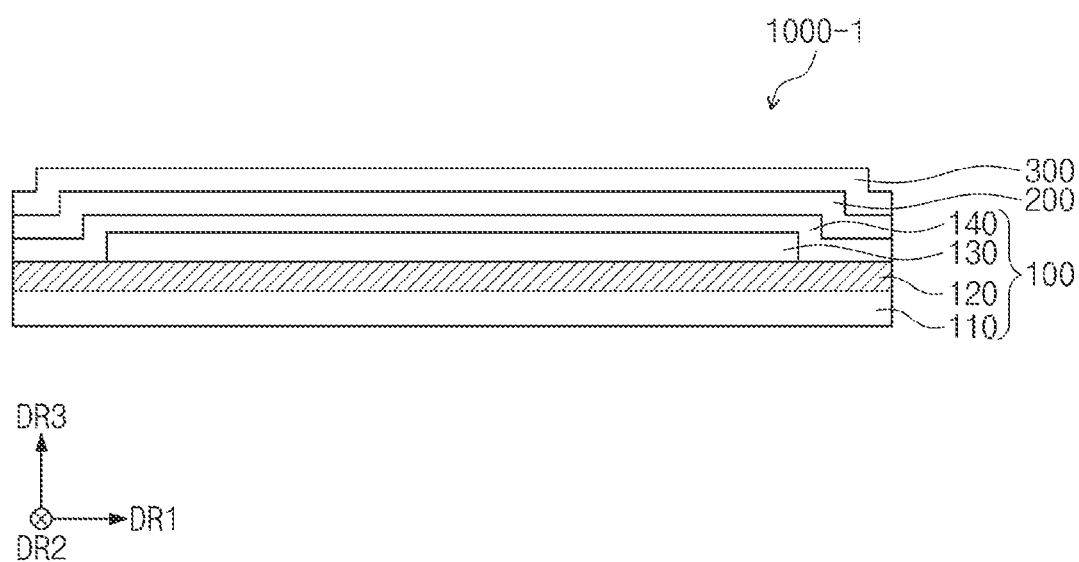
FIG. 2B is a cross-sectional view showing an electronic device according to an example embodiment of the present disclosure.

FIG. 2B is a cross-sectional view showing an electronic device 1000-1 according to an example embodiment of the present disclosure.

Referring to FIG. 2B, in an example embodiment, the electronic device 1000-1 may further include an anti-reflective layer 300.

For convenience of explanation, to the extent that a further description of elements and technical aspects is omitted, it may be assumed that these elements and technical aspects are at least similar to corresponding elements and technical aspects that have been described elsewhere in the present disclosure.

The anti-reflective layer 300 may reduce reflectance of an external light incident to the electronic device 1000-1 from an outside source.

The anti-reflective layer 300 may be disposed on the sensor layer 200. However, the position of the anti-reflective layer 300 is not limited thereto. For example, in an example embodiment, the anti-reflective layer 300 may be disposed between the sensor layer 200 and the display layer 100.

According to an example embodiment of the present disclosure, the anti-reflective layer 300 may include color filters. The color filters may be arranged in a predetermined arrangement. The arrangement of the color filters may be determined by taking into account colors of light emitted from pixels included in the display layer 100. In addition, the anti-reflective layer 300 may further include a black matrix adjacent to the color filters.

According to an example embodiment of the present disclosure, the anti-reflective layer 300 may include a destructive interference structure. For example, the destructive interference structure may include a first reflective layer and a second reflective layer disposed on a layer different from a layer on which the first reflective layer is disposed. A first reflective light and a second reflective light, which are respectively reflected from the first reflective layer and the second reflective layer, may destructively interfere with each other, and thus, the reflectance of the external light may be reduced.

The anti-reflective layer 300 may include a stretching type synthetic resin film. For example, the anti-reflective layer 300 may be provided by dyeing an iodine compound on a polyvinyl alcohol film (PVA film).

Figure 3:
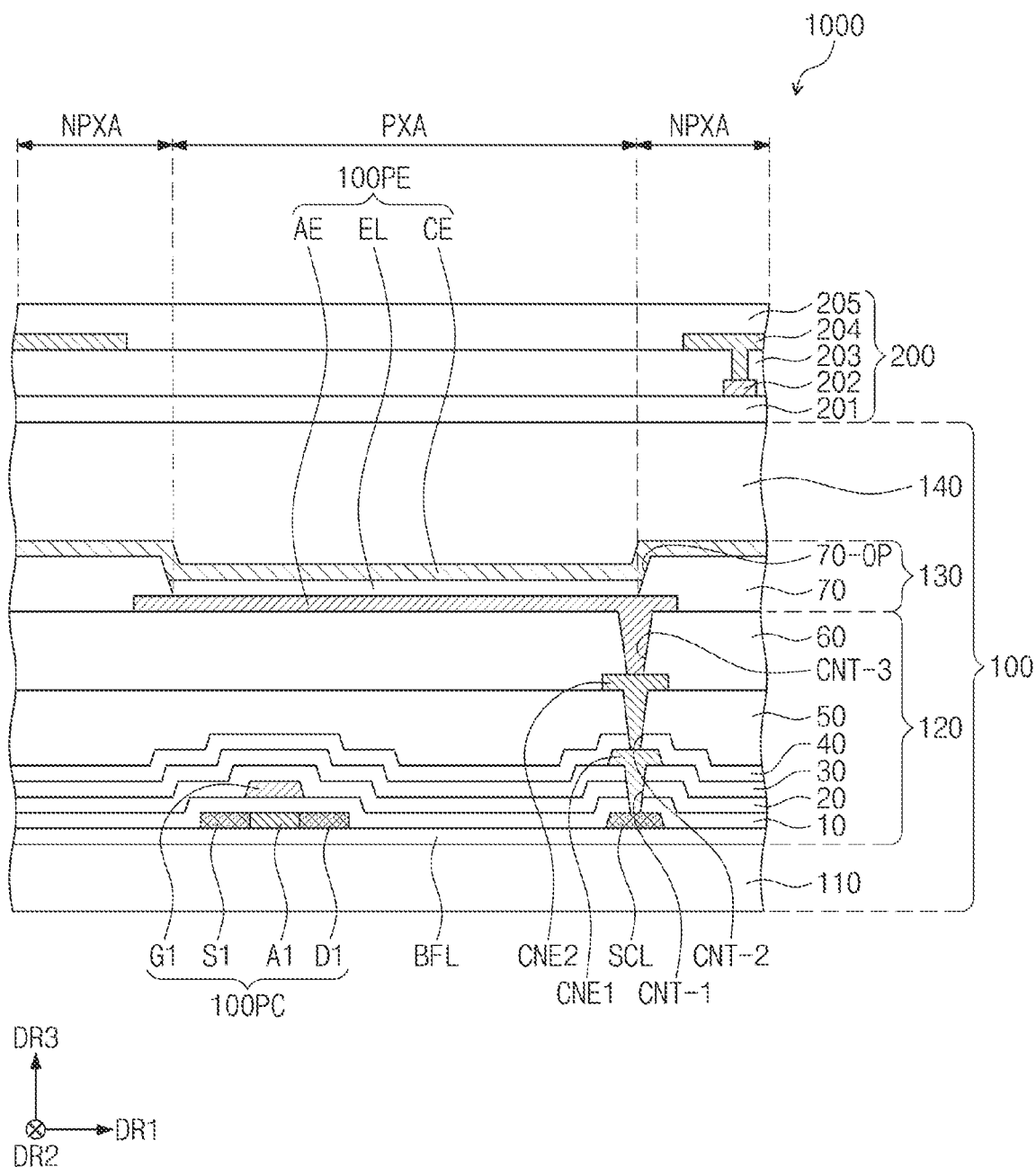
FIG. 3 is a cross-sectional view showing an electronic device according to an example embodiment of the present disclosure.

FIG. 3 is a cross-sectional view showing the electronic device 1000 according to an example embodiment of the present disclosure.

Referring to FIG. 3, in an example embodiment, the display layer 100 disposed below the base layer 201 of the sensor layer 200.

The display layer 100 may include, for example, a plurality of insulating layers, a semiconductor pattern, a conductive pattern, and a signal line. An insulating layer, a semiconductor layer, and a conductive layer may be formed by, for example, a coating or depositing process. Then, the insulating layer, the semiconductor layer, and the conductive layer may be selectively patterned by a photolithography process. The semiconductor pattern, the conductive pattern, and the signal line included in the circuit layer 120 and the light emitting element layer 130 may be formed through the above-described processes. Then, the encapsulation layer 140 that covers the light emitting element layer 130 may be formed.

At least one inorganic layer may be formed on an upper surface of the base layer 110. The inorganic layer may include at least one of, for example, aluminum oxide, titanium oxide, silicon oxide, silicon nitride, silicon oxynitride, zirconium oxide, and hafnium oxide. The inorganic layer may be formed in multiple layers. The inorganic layers may form a barrier layer and/or a buffer layer. In an example embodiment, the display layer 100 may include a buffer layer BFL.

The buffer layer BFL may increase a coupling force between the base layer 110 and the semiconductor pattern. The buffer layer BFL may include, for example, a silicon oxide layer and a silicon nitride layer, and the silicon oxide layer and the silicon nitride layer may be alternately stacked with each other.

The semiconductor pattern may be disposed on the buffer layer BFL. The semiconductor pattern may include polysilicon. However, the semiconductor pattern is not limited thereto. For example, according to example embodiments, the semiconductor pattern may include amorphous silicon or an oxide semiconductor.

FIG. 3 shows only a portion of the semiconductor pattern. It is to be understood that the semiconductor pattern may be further disposed in other areas. The semiconductor pattern may be arranged with a specific rule over the pixels. The semiconductor pattern may have different electrical properties depending on whether it is doped. The semiconductor pattern may include a first region having high conductivity and a second region having low conductivity. The first region may be doped with an n-type dopant or a p-type dopant. A p-type transistor may include a doped region doped with the p-type dopant, and an n-type transistor may include a doped region doped with the n-type dopant. The second region may be a non-doped region or a region doped with a lower concentration than the first region. The doped region may have a conductivity greater than that of the non-doped region and may substantially serve as an electrode or signal line. The non-doped region may substantially correspond to an active region (or channel) of the transistor. For example, a portion of the semiconductor pattern may be the active region of the transistor, another portion of the semiconductor pattern may be a source or a drain of the transistor, and the other portion of the semiconductor pattern may be a connection electrode or a connection signal line.

Each of the pixels may have an equivalent circuit that includes seven transistors, one capacitor, and a light emitting element, and the equivalent circuit may be changed in various ways. FIG. 3 shows one transistor 100PC and the light emitting element 100PE included in the pixel.

A source S1 an active region A1 and a drain D1 of the transistor 100PC may be formed from the semiconductor pattern. The source S1 and the drain D1 may extend in opposite directions to each other from the active region A1 in a cross-section. FIG. 3 shows a portion of a connection signal line SCL formed from the semiconductor pattern. The connection signal line SCL may be electrically connected to the drain D1 of the transistor 100PC in a plane.

A first insulating layer 10 may be disposed on the buffer layer BFL. The first insulating layer 10 may commonly overlap the pixels and may cover the semiconductor pattern. The first insulating layer 10 may be an inorganic layer and/or an organic layer, and may have a single-layer or multi-layer structure. The first insulating layer 10 may include at least one of, for example, aluminum oxide, titanium oxide, silicon oxide, silicon nitride, silicon oxynitride, zirconium oxide, and hafnium oxide. In an example embodiment, the first insulating layer 10 may have a single-layer structure of a silicon oxide layer. Not only the first insulating layer 10, but also an insulating layer of the circuit layer 120 described later may be an inorganic layer and/or an organic layer, and may have a single-layer or multi-layer structure. The inorganic layer may include at least one of the above-described materials. However, the inorganic layer is not limited thereto.

A gate G1 of the transistor 100PC may be disposed on the first insulating layer 10. The gate G1 may be a portion of a metal pattern. The gate G1 may overlap the active region A1. The gate G1 may be used as a mask in a process of doping the semiconductor pattern.

A second insulating layer 20 may be disposed on the first insulating layer 10 and may cover the gate G1. The second insulating layer 20 may commonly overlap the pixels. The second insulating layer 20 may be an inorganic layer and/or an organic layer, and may have a single-layer or multi-layer structure. In an example embodiment, the second insulating layer 20 may have a single-layer structure of a silicon oxide layer.

A third insulating layer 30 may be disposed on the second insulating layer 20. In an example embodiment, the third insulating layer 30 may have a single-layer structure of a silicon oxide layer or a silicon nitride layer.

A first connection electrode CNE1 may be disposed on the third insulating layer 30. The first connection electrode CNE1 may be connected to the connection signal line SCL through a contact hole CNT-1 defined through the first insulating layer 10, the second insulating layer 20, and the third insulating layer 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 including the light emitting element 100PE may be disposed on the circuit layer 120. The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

As shown in FIG. 3, the active area 1000A (refer to FIG. 1) may include a light emitting area PXA and a non-light-emitting area NPXA disposed adjacent to the light emitting area PXA. The non-light-emitting area NPXA may surround the light emitting area PXA. In an example embodiment, the light emitting area PXA may be defined to correspond to the portion of the first electrode AE exposed through the opening 70-OP.

The light emitting layer EL may be disposed on the first electrode AE. The light emitting layer EL may be disposed in an area corresponding to the opening 70-OP. That is, the light emitting layer EL may be formed in each of the pixels after being divided into a plurality of portions. When the light emitting layer EL is formed in each of the pixels after being divided into a plurality of portions, each of the light emitting layers EL may emit a light having at least one of blue, red, and green colors. However, the present disclosure is not limited thereto. The light emitting layer EL may be connected to the pixels and may be commonly provided. In this case, the light emitting layer EL may provide a blue light or a white light.

The second electrode CE may be disposed on the light emitting layer EL. The second electrode CE may have an integral shape and may be commonly disposed over the pixels.

In an example embodiment, a hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels using, for example, an open mask.

The encapsulation layer 140 may be disposed on the light emitting element layer 130. The encapsulation layer 140 may protect the light emitting element layer 130 from, for example, moisture, oxygen, and foreign substance such as dust particles.

The sensor layer 200 may include a base layer 201, a first conductive layer 202, a sensing insulating layer 203, a second conductive layer 204, and a cover insulating layer 205.

In an example embodiment, the base layer 201 may be an inorganic layer including one of, for example, silicon nitride, silicon oxynitride, and silicon oxide. In an example embodiment, the base layer 201 may be an organic layer including, for example, an epoxy-based resin, an acrylic-based resin, or an imide-based resin. The base layer 201 may have a single-layer structure or a multi-layer structure of layers stacked in the third direction DR3.

The first conductive layer 202 and the second conductive layer 204 may have a single-layer structure or a multi-layer structure of layers stacked in the third direction DR3.

The conductive layer having the single-layer structure may include a metal layer or a transparent conductive layer. The metal layer may include, for example, molybdenum, silver, titanium, copper, aluminum, or alloys thereof. The transparent conductive layer may include a transparent conductive oxide such as, for example, indium tin oxide (ITO), indium zinc oxide (IZO), zinc oxide (ZnO), indium zinc tin oxide (ITZO), etc. In addition, the transparent conductive layer may include a conductive polymer such as, for example, Poly(3,4-ethylenedioxythiophene) (PEDOT), metal nanowire, graphene, etc.

The conductive layer having the multi-layer structure may include metal layers. The metal layers may have a three-layer structure of titanium/aluminum/titanium. The conductive layer having the multi-layer structure may include at least one metal layer and at least one transparent conductive layer.

The sensor layer 200 may obtain information about the external input based on a variation in mutual capacitance or a variation in self-capacitance. For example, the sensor layer 200 may include sensing patterns and bridge patterns. At least a portion of the sensing patterns and the bridge patterns may be included in the first conductive layer 202, and at least a portion of the sensing patterns and the bridge patterns may be included in the second conductive layer 204.

At least one of the sensing insulating layer 203 and the cover insulating layer 205 may include an inorganic layer. The inorganic layer may include at least one of, for example, aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of, for example, an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 4:
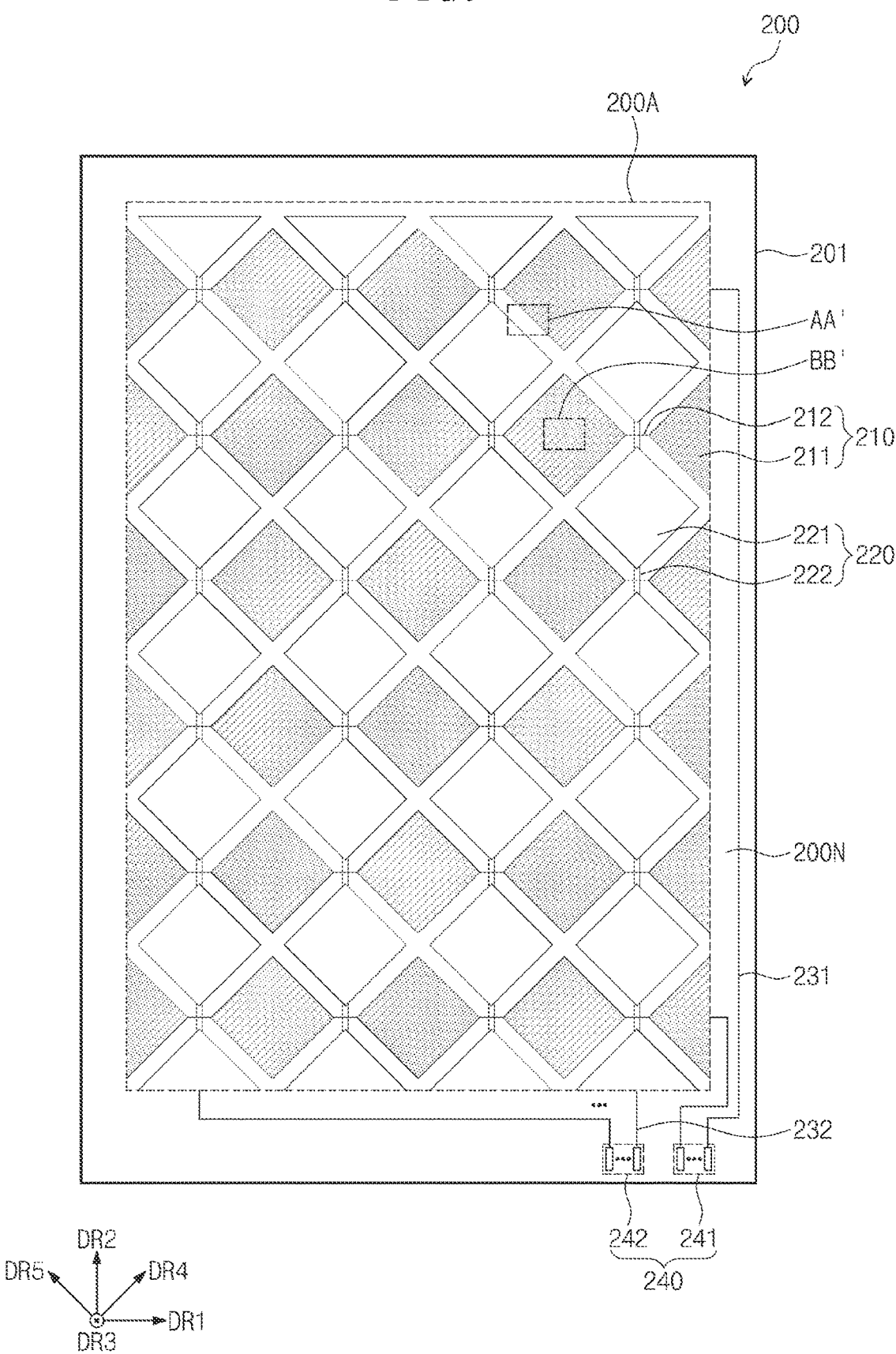
FIG. 4 is a plan view showing a sensor layer according to an example embodiment of the present disclosure.

FIG. 4 is a plan view showing the sensor layer 200 according to an example embodiment of the present disclosure.

Referring to FIG. 4, the sensor layer 200 may sense the external input applied thereto from an outside source. The external input may be the user's input. As described above, the user input may include a variety of external inputs such as, for example, a part of a user's body, light, heat, a pen, or pressure. The sensor layer 200 may include a sensing area 200A and a peripheral area 200N, which are defined in the sensor layer 200. The sensing area 200A may be activated in response to an electrical signal. For example, the sensing area 200A may be an area in which the input is sensed. The peripheral area 200N may surround the sensing area 200A.

The sensor layer 200 may include a plurality of first sensing electrodes 210, a plurality of second sensing electrodes 220, a plurality of first sensing lines 231, a plurality of second sensing lines 232, and a plurality of sensing pads 240.

The first sensing electrodes 210 and the second sensing electrodes 220 may be disposed in the sensing area 200A. The sensor layer 200 may obtain information about the external input based on a variation in mutual capacitance between the first sensing electrodes 210 and the second sensing electrodes 220.

Each of the first sensing electrodes 210 may extend in the first direction DR1. The first sensing electrodes 210 may be arranged in the second direction DR1 to be spaced apart from each other. Each of the second sensing electrodes 220 may extend in the second direction DR2 and may be arranged in the first direction DR1 to be spaced apart from each other. The first sensing electrodes 210 and the second sensing electrodes 220 may cross each other.

Each of the first sensing electrodes 210 may include a plurality of first portions 211 and a second portion 212 disposed between the first portions 211 adjacent to each other among the first portions 211. The first portions 211 may be referred to as first sensing patterns or sensing portions, and the second portion 212 may be referred to as a "connection portion" or a "crossing portion."

The first portions 211 and the second portion 212 may be connected to each other to have an integral shape. Accordingly, the second portion 212 may be defined as a portion of the first sensing electrode 210 crossing the second sensing electrode 220. The first portions 211 and the second portion 212 may be disposed on the same layer as each other.

Each of the second sensing electrodes 220 may include a plurality of sensing patterns 221 and a bridge pattern 222 electrically connected to two sensing patterns 221 adjacent to each other among the sensing patterns 221. The sensing patterns 221 and the bridge pattern 222 may be disposed on different layers from each other. FIG. 4 shows two bridge patterns 222 that connect two sensing patterns 221 as a representative example. However, the present disclosure is not limited thereto. For example, according to example embodiments, the number of the bridge patterns 222 may be one or three or more.

The first portions 211 and the second portion 212 may be disposed on the same layer as the sensing patterns 221. The layer on which the bridge pattern 222 is disposed may be different from the layer on which the first portions 211, the second portion 212, and the sensing patterns 221 are disposed. For example, the bridge pattern 222 may be included in the first conductive layer 202 (refer to FIG. 3), and the first portions 211, the second portion 212, and the sensing patterns 221 may be included in the second conductive layer 204 (refer to FIG. 3). However, the present disclosure is not limited thereto, as long as the bridge pattern 222 and the second portion 212 are disposed on different layers from each other.

Each of the first sensing electrodes 210 and the second sensing electrodes 220 may be electrically connected to a corresponding sensing line among the first sensing lines 231 and the second sensing lines 232. For example, one first sensing electrode 210 may be connected to one first sensing line 231, and one second sensing electrode 220 may be electrically connected to one second sensing line 232. However, the connection relationship between the first or second sensing lines 231 and 232 and the first and second sensing electrodes 210 and 220 is not limited thereto. For example, in an example embodiment, one first sensing electrode 210 may be connected to two first sensing lines 231, one first sensing line 231 may be electrically connected to one end of the first sensing electrode 210, and another first sensing line 231 may be electrically connected to the other end of the first sensing electrode 210.

The sensing pads 240 may be electrically connected to the first and second sensing lines 231 and 232, respectively. The sensing pads 240 may include first sensing pads 241 electrically connected to the first sensing lines 231, respectively, and second sensing pads 242 electrically connected to the second sensing lines 232, respectively.

FIG. 5A is an enlarged plan view showing an area AA' of FIG. 4 according to an example embodiment of the present disclosure.

FIG. 5A shows an enlarged view of an area where the first sensing pattern 211 of the first sensing electrode 210 and the second sensing pattern 221 of the second sensing electrode 220 are adjacent to each other. Hereinafter, the first portions 211 of the first sensing electrodes 210 will be referred to as first sensing patterns, and the sensing patterns 221 of the second sensing electrodes 220 will be referred to as second sensing patterns.

Each of the first sensing patterns 211 and the second sensing patterns 221 may have a mesh (or lattice, or net) structure. The sensor layer 200 may be disposed directly on the display layer 100 (refer to FIG. 3). In this case, a gap between the sensor layer 200 and the second electrode CE (refer to FIG. 3) of the display layer 100 (refer to FIG. 3) may be reduced. According to an example embodiment of the present disclosure, since each of the first sensing pattern 211 and the second sensing pattern 221 has the mesh structure, a base capacitance caused by a parasitic capacitance between the first sensing electrodes 210 and the second electrode CE (refer to FIG. 3) and a base capacitance caused by a parasitic capacitance between the second sensing electrodes 220 and the second electrode CE (refer to FIG. 3) may be further reduced compared to when the first sensing pattern 211 and the second sensing pattern 221 are integrally formed as a single unitary electrode. Accordingly, as each of the first sensing pattern 211 and the second sensing pattern 221 has the mesh structure, a touch sensitivity of the sensor layer 200 may be improved.

The first sensing pattern 211 may include a first mesh pattern 211MP and an opening 2110P defined by the first mesh pattern 211MP. The second sensing pattern 221 may include a second mesh pattern 221MP and an opening 2210P defined by the second mesh pattern 221MP.

The first mesh pattern 211MP may include a first mesh line 211M1 and a first cross-mesh line 211M2, and the second mesh pattern 221MP may include a second mesh line 221M1 and a second cross-mesh line 221M2. The first mesh line 211M1 and the second mesh line 221M1 may extend in the same direction. For example, the first mesh line 211M1 and the second mesh line 221M1 may extend in a fourth direction DR4. The first cross-mesh line 211M2 and the second cross-mesh line 221M2 may extend in a same direction crossing the first mesh line 211M1 and the second mesh line 221M1. For example, the first cross-mesh line 211M2 and the second cross-mesh line 221M2 may extend in a fifth direction DR5.

The fourth direction DR4 and the fifth direction DR5 may be defined on the plane defined by the first direction DR1 and the second direction DR2. The fourth direction DR4 may cross the first and second directions DR1 and DR2. However, the present disclosure is not limited thereto. For example, according to example embodiments, the fourth direction DR4 may be the same direction as the first direction DR1 or the second direction DR2. The fifth direction DR5 may cross the fourth direction DR4. However, the fifth direction DR5 is not limited thereto, as long as the fifth direction DR5 is different from the fourth direction DR4. For example, the fifth direction DR5 may be a direction that forms an angle greater than about 0 degrees and smaller than about 180 degrees with the fourth direction DR4.

According to an example embodiment of the present disclosure, the shape of the mesh line, which defines a disconnection portion, may be defined by a portion that is manifested as defects and a portion that is not manifested as defects when the disconnection portion is short-circuited, and the portions may be implemented to have different shapes from each other. Accordingly, when the disconnection occurs in a specific area, a repair process may be performed by determining whether the specific area is an area where the repair process is required. That is, since the repair process may be performed only in the area that requires the repair process, a manufacturing yield of the electronic device 1000 (refer to FIG. 1) may be increased, since the repair process is not additionally performed in another area(s) that does not require the repair process. In addition, in an example embodiment, the repair process may be omitted when the disconnection occurs only in an area that does not require the repair process.

For example, the first sensing pattern 211 and the second sensing pattern 221 may be components that are required to be electrically insulated from each other for proper operation of the sensor layer 200. The first sensing pattern 211 may be electrically connected to the first sensing line 231 (refer to FIG. 4), and the second sensing pattern 221 may be electrically connected to the second sensing line 232 (refer to FIG. 4). Accordingly, the first sensing pattern 211 and the second sensing pattern 221 may transmit, receive, or transceive different electrical signals from each other. Thus, when the disconnection portion that defines a boundary between the first sensing pattern 211 and the second sensing pattern 221 is short-circuited, the repair process is required.

In addition, a disconnection portion OLP (refer to FIG. 6) may be defined in each of the first sensing pattern 211 and the second sensing pattern 221. The disconnection portion OLP (refer to FIG. 6) may be additionally provided in the first sensing pattern 211 and the second sensing pattern 221 such that the boundary between the first sensing pattern 211 and the second sensing pattern 221 is not visible to a user. The disconnection portion OLP (refer to FIG. 6) may be provided in the first sensing pattern 211 to which one signal is provided. Accordingly, in example embodiments, although the disconnection portion OLP (refer to FIG. 6) is short-circuited, the disconnection portion OLP is not considered as an electrical defect. Accordingly, in example embodiments, even though the disconnection portion OLP (refer to FIG. 6) is short-circuited, the disconnection portion OLP (refer to FIG. 6) does not require the repair process.

The first mesh line 211M1 may include at least one of a first end EG1 and a second end EG2. For example, the first mesh line 211M1 is provided in plural. Some of the plurality of first mesh lines may include the first end EG1, and the others of the plurality of first mesh lines may include the first end EG1 and the second end EG2. The first end EG1 and the second end EG2 may correspond to portions defined at ends of the first mesh line 211M1 in a direction in which the first mesh line 211M1 extends. The first end EG1 may be a portion facing the second sensing pattern 221, and the second end EG2 may be a portion spaced apart from the second sensing pattern 221.

The first end EG1 may directly face the second sensing pattern 221, and the second end EG2 may be spaced apart from the second sensing pattern 221 with another portion of the first mesh line 211M1 interposed therebetween. The expression "the first end EG1 may directly face the second sensing pattern 221" means that no conductive material is present between the first end EG1 and the second sensing pattern 221.

For example, as shown in FIG. 5A, the first end EG1 of the first mesh line 211M1 may directly face a third end EG3 of the second mesh line 211M1 in the fourth direction DR4 with no conductive material disposed between the first end EG1 and the third end EG3. Further, the second end EG2 of the first mesh line 211M1 may be spaced apart from the second sensing pattern 221, for example, with a portion of the first mesh line 211M1 other than the second end EG2 disposed therebetween. Further, the second end EG2 of one first mesh line 211M1 may directly face another first mesh line 211M1 in the fourth direction DR4, with no conductive material disposed therebetween.

The second end EG2 may be defined in the first sensing pattern 211, and the second end EG2 of the first mesh line 211M1 may directly face another first mesh line 211M1. In this case, the first mesh line 211M1 in which the second end EG2 is defined and the another first mesh line 211M1 may receive the same signal as each other. For example, the second end EG2 may be the area where the repair process is not required even though it is short-circuited.

The first end EG1 and the second end EG2 may have different shapes from each other. Accordingly, when the disconnection occurs in the first end EG1, the repair process may be performed, and when the disconnection occurs in the second end EG2, the disconnection may be ignored.

The first end EG1 may include first side edges SE11 and SE12 extending substantially parallel to each other, and a first connection edge CE1 connecting the first side edges SE11 and SE12. An angle between the first side edge SE11 and the first connection edge CE1 may be greater than about 0 degrees and smaller than about 90 degrees. That is, the first connection edge CE1 may include an inclination surface inclined with respect to the first side edge SE11.

The second mesh line 221M1 may include at least one of a third end EG3 and a fourth end EG4. For example, the second mesh line 221M1 is provided in plural. Some of the plurality of second mesh lines may include the third end EG3, and the others of the plurality of second mesh lines may include the third end EG3 and the fourth end EG4. The third end EG3 and the fourth end EG4 may correspond to portions defined at ends of the second mesh line 221M1 in a direction in which the second mesh line 221M1 extends. The third end EG3 may be a portion facing the first sensing pattern 211, and the fourth end EG4 may be a portion spaced apart from the first sensing pattern 211.

The third end EG3 may have substantially the same shape as the first end EG1. As another way, the third end EG3 may have a shape corresponding to a shape of the first end EG1. For example, if the third end EG3 has a convex shape, the first end EG1 may have a concave shape.

The first end EG1 may face the third end EG3, and a first end EG11 may face a third end EG31 with respect to a boundary between the first sensing pattern 211 and the second sensing pattern 221. The first end EG1 and the first end EG11 may be alternately arranged with each other in the fifth direction DR5, and the third end EG3 and the third end EG31 may be alternately arranged with each other in the fifth direction DR5. The first end EG1 and the first end EG11 may have a symmetrical shape based on a reference line extending in the fourth direction DR4, and the third end EG3 and the third end EG31 may have a symmetrical shape based on the fourth direction DR4.

When a short-circuit occurs in a portion in which the first end EG1 and the first end EG11 are alternately arranged with each other and the third end EG3 and the third end EG31 are alternately arranged with each other, this may be determined as defects. Thus, according to example embodiments, defects analysis may become easier to perform, and the process yield may be increased by repairing the portion in which the defects occur.

A length LT1 of each of the first ends EG1 and EG11 may be substantially the same as a length LT2 of each of the third ends EG3 and EG31. The length LT1 may mean a maximum length of the first mesh line 211M1 protruding from the first cross-mesh line 211M2 that is closest to each of the first ends EG1 and EG11. The length LT2 may mean a maximum length of the second mesh line 221M1 protruding from the second cross-mesh line 221M2 that is closest to each of the third ends EG3 and EG31.

FIG. 5B is an enlarged plan view showing an area AA' of FIG. 4 according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIGS. 4 and 5B, a first mesh line 211M1 may include a first end EG1 and a second end EG2. The first end EG1 may directly face the second sensing pattern 221, and the second end EG2 may be spaced apart from the second sensing pattern 221 with another portion of the first mesh line 211M1 interposed therebetween. The first end EG1 and the second end EG2 may have different shapes from each other. Accordingly, when the disconnection occurs in the first end EG1, the repair process may be performed, and when the disconnection occurs in the second end EG2, the disconnection may be ignored.

A second mesh line 221M1 may include a third end EG3 and a fourth end EG4. The third end EG3 may face the first sensing pattern 211, and the fourth end EG4 may be spaced apart from the first sensing pattern 211. The third end EG3 may have substantially the same shape as the first end EG1. As another way, the third end EG3 may have a shape corresponding to a shape of the first end EG1. For example, if the third end EG3 has a convex shape, the first end EG1 may have a concave shape.

The first end EG1 may face the third end EG3 with respect to a boundary between the first sensing pattern 211 and the second sensing pattern 221. The first end EG1 may be repeatedly arranged in the fifth direction DR5, and the third end EG3 may be repeatedly arranged in the fifth direction DR5.

When a short-circuit occurs in a portion in which the first end EG1 is repeatedly arranged and the third end EG3 is repeatedly arranged, this may be determined as defects. Thus, according to example embodiments, defects analysis may become easier to perform, and the process yield may be increased by repairing the portion in which the defects occur.

Figure 5C:
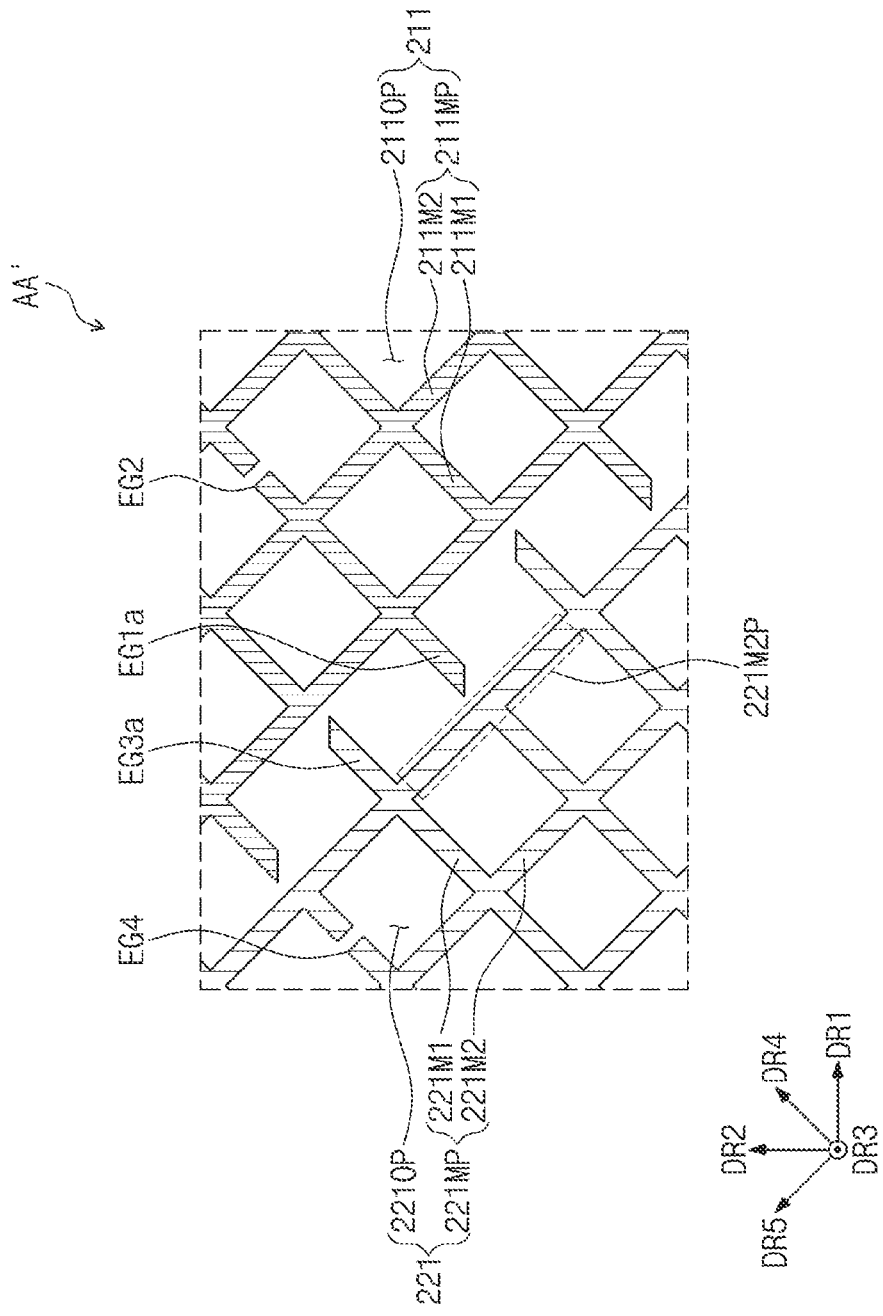
FIG. 5C is an enlarged plan view showing an area AA' of FIG. 4 according to an example embodiment of the present disclosure.

FIG. 5C is an enlarged plan view showing an area AA' of FIG. 4 according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIGS. 4 and 5C, a first mesh line 211M1 may include a first end EG1$a$ and a second end EG2. The first end EG1$a$ may directly face the second sensing pattern 221, and the second end EG2 may be spaced apart from the second sensing pattern 221 with another portion of the first mesh line 211M1 interposed therebetween. The first end EG1$a$ and the second end EG2 may have different shapes from each other. Accordingly, when the disconnection occurs in the first end EG1$a$, the repair process may be performed, and when the disconnection occurs in the second end EG2, the disconnection may be ignored.

A second mesh line 221M1 may include a third end EG3$a$ and a fourth end EG4. The third end EG3$a$ may face the first sensing pattern 211, and the fourth end EG4 may be spaced apart from the first sensing pattern 211. The third end EG3$a$ may have substantially the same shape as the first end EG1$a$. The first end EG1$a$ and the third end EG3$a$ may be alternately arranged with each other in the fifth direction DR5. The first end EG1$a$ may face a second cross-mesh line 221M2 of the second sensing pattern 221 with respect to a boundary between the first sensing pattern 211 and the second sensing pattern 221, and the third end EG3$a$ may face a first cross-mesh line 211M2 of the first sensing pattern 211 with respect to the boundary between the first sensing pattern 211 and the second sensing pattern 221. The first end EG1$a$ may directly face a portion 221M2P of the second cross-mesh line 221M2. In a case where the first end EG1$a$ is electrically connected to the portion 221M2P, the repair process may be performed on a portion at which the first end EG1$a$ is electrically connected to the portion 221M2P, and thus, the first end EG1$a$ may be electrically separated from the portion 221M2P.

Figure 5D:
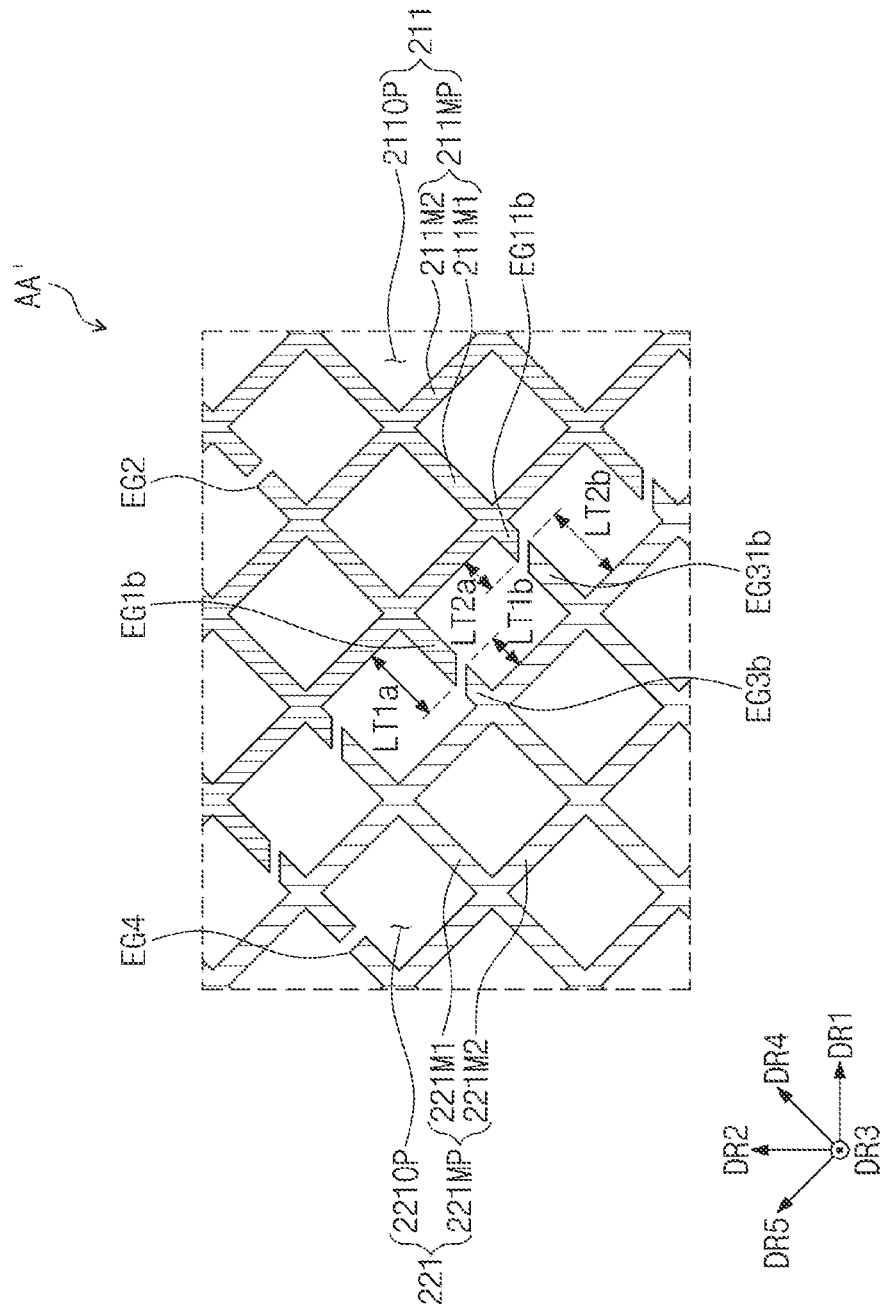
FIG. 5D is an enlarged plan view showing an area AA' of FIG. 4 according to an example embodiment of the present disclosure.

FIG. 5D is an enlarged plan view showing an area AA' of FIG. 4 according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIGS. 4 and 5D, a first mesh line 211M1 may include first ends EG1$b$ and EG11$b$ and a second end EG2. The first ends EG1$b$ and EG11$b$ may directly face the second sensing pattern 221, and the second end EG2 may be spaced apart from the second sensing pattern 221 with another portion of the first mesh line 211M1 interposed therebetween. The first ends EG1$b$ and EG11$b$ and the second end EG2 may have different shapes from each other. Accordingly, when a disconnection occurs in the first ends EG1$b$ and EG11$b$, the repair process may be performed, and when the disconnection occurs in the second end EG2, the disconnection may be ignored.

A second mesh line 221M1 may include third ends EG3$b$ and EG31$b$ and a fourth end EG4. The third ends EG3$b$ and EG31$b$ may be portions facing the first sensing pattern 211, and the fourth end EG4 may be a portion spaced apart from the first sensing pattern 211. The third ends EG3$b$ and EG31$b$ may have substantially the same shape as the first ends EG1$b$ and EG11$b$.

The first end EG1$b$ may face the third end EG3$b$ with respect to a boundary between the first sensing pattern 211 and the second sensing pattern 221, and the first end EG11$b$ may face the third end EG31$b$ with respect to the boundary between the first sensing pattern 211 and the second sensing pattern 221. The first end EG1$b$ and the first end EG11$b$ may be alternately arranged with each other in the fifth direction DR5, and the third end EG3$b$ and the EG31$b$ may be alternately arranged with each other in the fifth direction DR5.

A length LT1$a$ of the first end EG1$b$ and a length LT1$b$ of the third end EG3$b$ may be different from each other. For example, the length LT1$a$ of the first end EG1$b$ may be longer than the length LT1$b$ of the third end EG3$b$. A length LT2$a$ of the first end EG11$b$ and a length LT2$b$ of the third end EG31b may be different from each other. For example, the length LT2a of the first end EG11b may be shorter than the length LT2b of the third end EG31b.

In this case, a portion that defines the boundary between the first sensing pattern 211 and the second sensing pattern 221 may be defined as a zigzag shape instead of extending in a specific direction. Accordingly, the boundary may be prevented from being visible to a user. The portion that defines the boundary may mean an area in which a conductive pattern is not disposed between the first end EG1b and the third end EG3b and an area in which a conductive pattern is not disposed between the first end EG11b and the third end EG31b.

Figure 6:
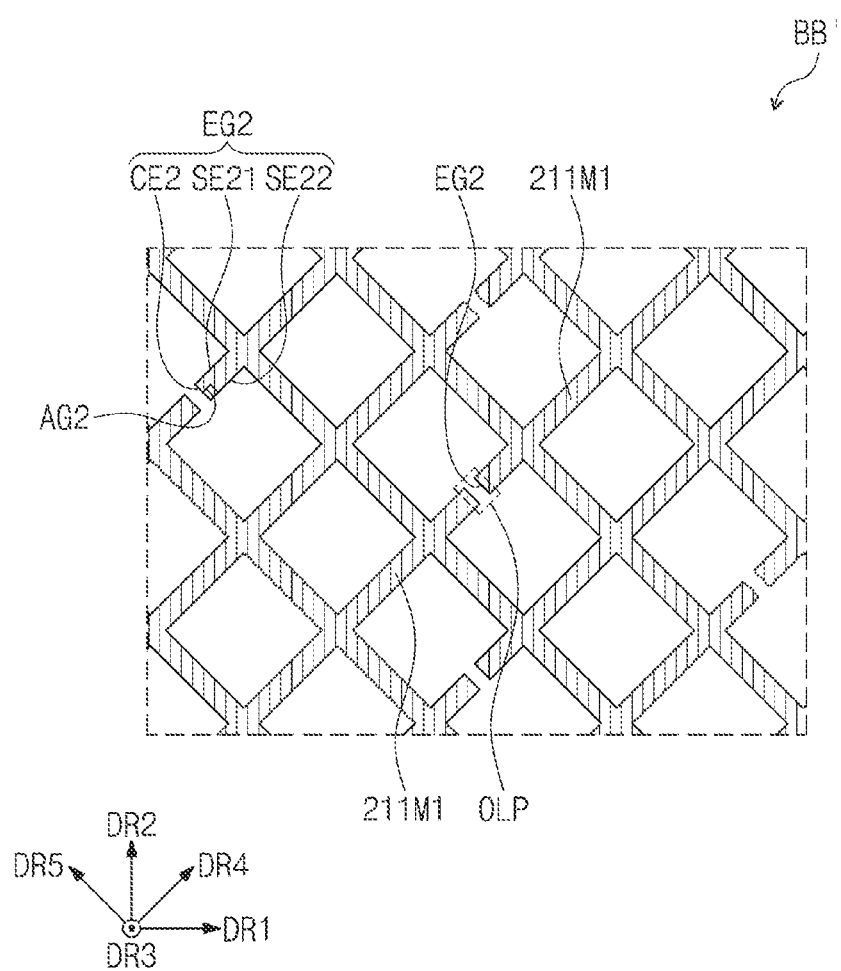
FIG. 6 is an enlarged plan view showing an area BB' of FIG. 4 according to an example embodiment of the present disclosure.

FIG. 6 is an enlarged plan view showing an area BB' of FIG. 4 according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIGS. 4, 5A, and 6, the second end EG2 may include second side edges SE21 and SE22 extending substantially parallel to each other, and a second connection edge CE2 connecting the second side edges SE21 and SE22. An angle AG2 between the second side edge SE22 and the second connection edge CE2 may be different from an angle AG1 between the first side edge SE11 and the first connection edge CE1. For example, the angle AG2 between the second side edge SE22 and the second connection edge CE2 may be about 90 degrees. However, the angle AG2 is not limited thereto. The length of the first connection edge CE1 and the second connection edge CE2 may be different from each other. For example, the first connection edge CE1 may have a length longer than a length of the second connection edge CE2.

The second end EG2 may define the disconnection portion OLP. The first mesh lines 211M1 disposed at both sides of the disconnection portion OLP may receive the same signal. Accordingly, in example embodiments, although the disconnection portion OLP is short-circuited, this is not manifested as an electrical defect. Therefore, when the disconnection portion OLP is short-circuited, the repair process may be omitted.

According to an example embodiment of the present disclosure, the first end EG1 that is manifested as a defect when being disconnected from peripheral conductive patterns and the second end EG2 that is not manifested as a defect when being disconnected from peripheral conductive patterns may be implemented to have different shapes to be distinguished from each other in the first sensing pattern 211. For example, referring to FIGS. 5A-5D and 6, in an example embodiment, the first end EG1 of the first mesh pattern 211MP facing the second mesh pattern 221MP may have a shape different from a shape of the second end EG2 of the first mesh pattern 211MP defining the disconnection portion OLP. Accordingly, when the disconnection occurs in a specific area, a repair process may be performed by determining whether the specific area requires the repair process. Thus, according to example embodiments, since the repair process may be performed in only the area where the repair process is required, the manufacturing yield of the electronic device 1000 (refer to FIG. 1) may be improved. In addition, the repair process may be omitted when the disconnection occurs in an area where the repair process is not required.

Figure 7A:
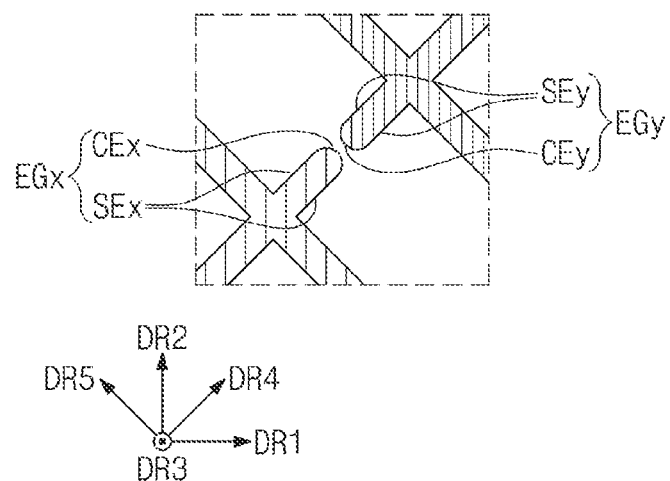
FIG. 7A is an enlarged plan view showing a sensor layer according to an example embodiment of the present disclosure.

FIG. 7A is an enlarged plan view showing a sensor layer according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIG. 7A, two ends EGx and EGy facing each other are shown as a representative example. The two ends EGx and EGy may have the same shape as each other.

The end EGx may include a side edge SEx and a connection edge CEx, and the end EGy may include a side edge SEy and a connection edge CEy. Each of the connection edges CEx and CEy may be a curved line. Either the first end EG1 (refer to FIG. 5A) or the second end EG2 (refer to FIG. 6) described above may be replaced with a shape of the end shown in FIG. 7A.

Figure 7B:
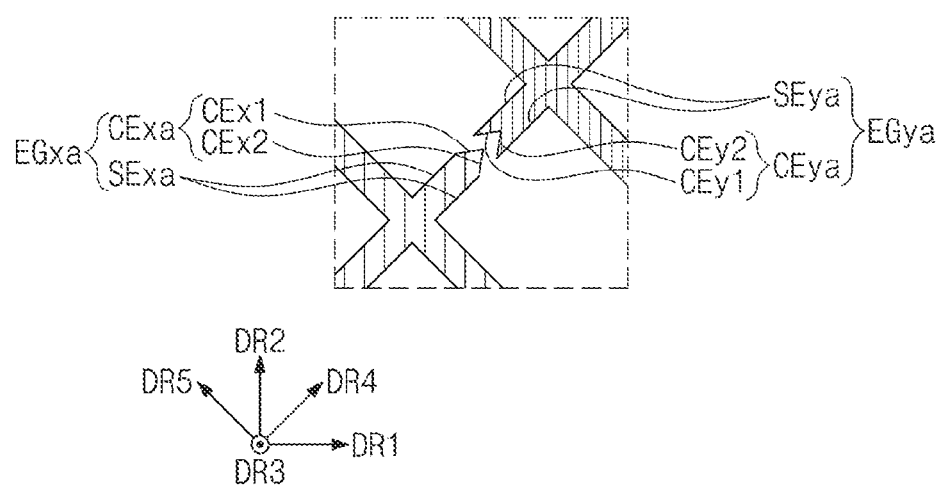
FIG. 7B is an enlarged plan view showing a sensor layer according to an example embodiment of the present disclosure.

FIG. 7B is an enlarged plan view showing a sensor layer according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIG. 7B, two ends EGxa and EGya facing each other are shown as a representative example. The two ends EGxa and EGya may have a shape corresponding to each other.

The end EGxa may include a side edge SExa and a connection edge CExa, and the end EGya may include a side edge SEya and a connection edge CEya. Each of the connection edges CExa and CEya may include straight lines. For example, the connection edge Cexa may include straight lines Cex1 and Cex2, and the connection edge Ceya may include straight lines Cey1 and Cey2. Either the first end EG1 (refer to FIG. 5A) or the second end EG2 (refer to FIG. 6) described above may be replaced with a shape of the end shown in FIG. 7B.

It is to be understood that, according to example embodiments, the shape of each of the first end EG1 (refer to FIG. 5A) and the second end EG2 (refer to FIG. 6) is not particularly limited, as long as the first end EG1 (refer to FIG. 5A) and the second end EG2 (refer to FIG. 6) have different shapes from each other. That is, the shape of each of the first end EG1 (refer to FIG. 5A) and the second end EG2 (refer to FIG. 6) is not limited to the shapes described with reference to FIGS. 5A to 5D, 6, 7A, and 7B. For example, referring to FIGS. 5A-5D, 6, 7A, and 7B, in an example embodiment, one of the first connection edge CE1 and the second connection edge CE2 may be a substantially straight line, and the other one of the first connection edge CE1 and the second connection edge CE2 may be a curved line. Still referring to FIGS. 5A-5D, 6, 7A, and 7B, in an example embodiment, one of the first connection edge CE1 and the second connection edge CE2 includes at least two substantially straight lines, and the other one of the first connection edge CE1 and the second connection edge CE2 includes one substantially straight line or one curved line.

Figure 8:
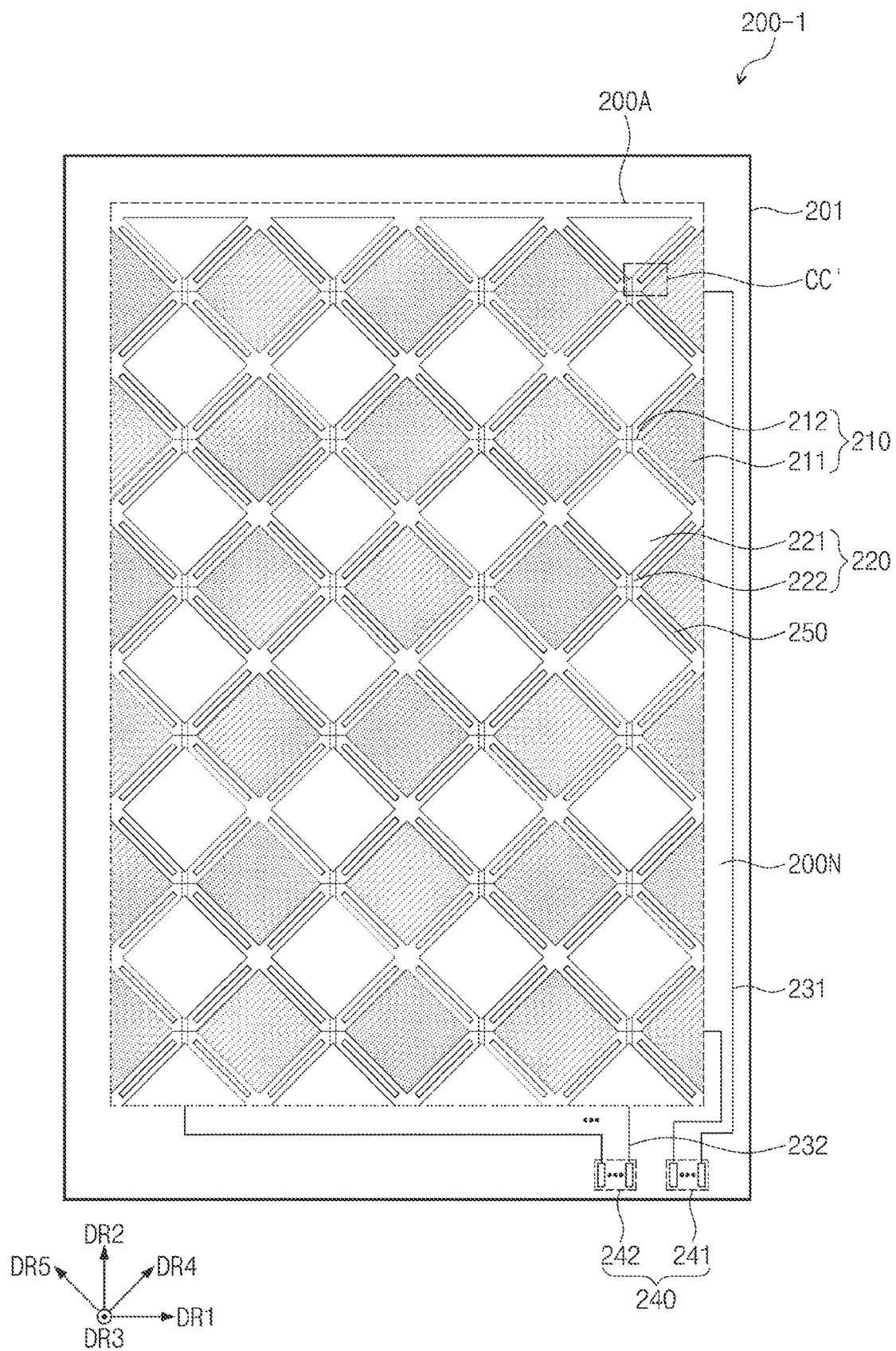
FIG. 8 is a plan view showing a sensor layer according to an example embodiment of the present disclosure.

FIG. 8 is a plan view showing a sensor layer 200-1 according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIG. 8, the sensor layer 200-1 may further include a dummy pattern 250. The dummy pattern 250 may be disposed on the base layer 201 in an area between a first sensing electrode 210 and a second sensing electrode 220. For example, the dummy pattern 250 may be disposed on the base layer 201 between a first sensing pattern 211 and a second sensing pattern 221. The dummy pattern 250 may be a floated pattern.

Figure 9:
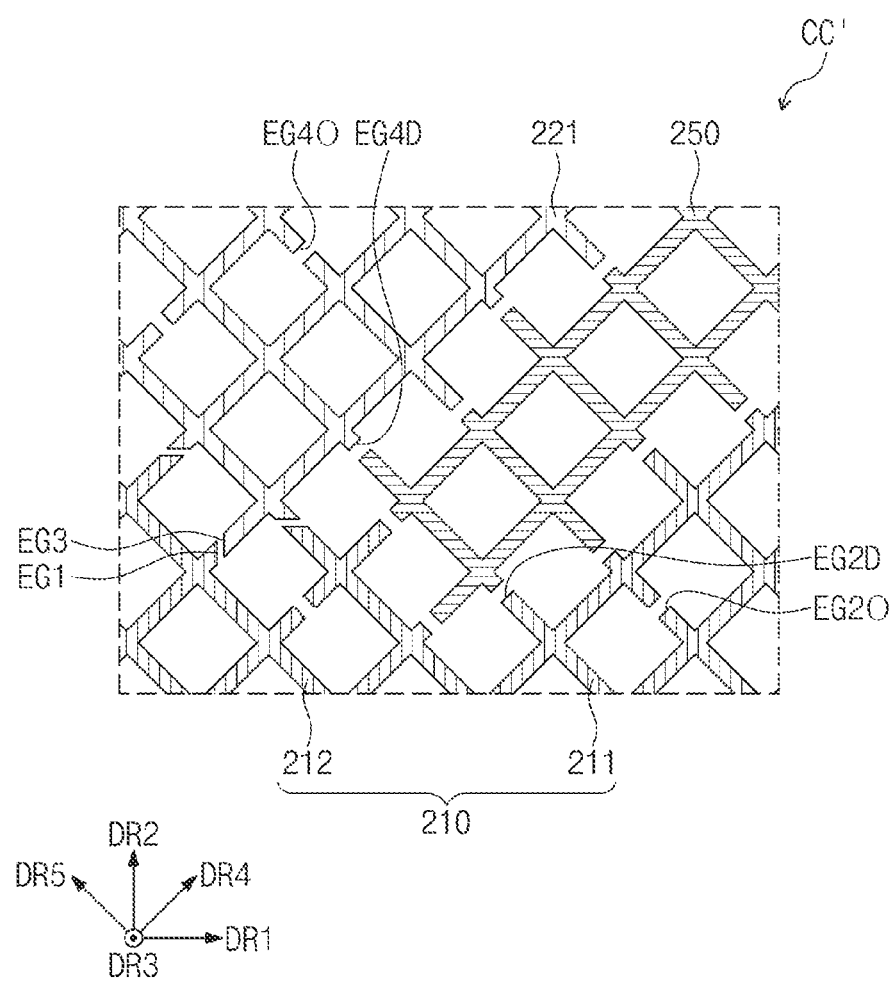
FIG. 9 is an enlarged plan view showing an area CC' of FIG. 8 according to an example embodiment of the present disclosure.

FIG. 9 is an enlarged plan view showing an area CC' of FIG. 8 according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

Referring to FIG. 9, portions of the second sensing pattern 221, the first sensing electrode 210, and the dummy pattern 250 are shown. A first portion 211 (hereinafter, referred to as the "first sensing pattern") of the first sensing electrode 210, a second portion 212 of the first sensing electrode 210, the second sensing pattern 221, and the dummy pattern 250 may be disposed on the same layer. The first sensing pattern, the second portion 212, the second sensing pattern 221, and the dummy pattern 250 may have a mesh structure.

The first sensing electrode 210 may include a first end EG1 and second ends EG2O and EG2D. The first end EG1 may be a portion facing the second sensing pattern 221, and the second ends EG2O and EG2D may be a portion spaced apart from the second sensing pattern 221. For example, the second end EG2O may be provided in the first sensing pattern 211, and the second end EG2D may face the dummy pattern 250. For example, the second end EG2D may be spaced apart from the second sensing pattern 221 in the fifth direction DR5 with the dummy pattern 250 interposed therebetween.

The second sensing pattern 221 may include a third end EG3 and fourth ends EG4O and EG4D. The third end EG3 may be a portion facing the first sensing electrode 210, and the fourth ends EG4O and EG4D may be a portion spaced apart from the first sensing pattern 211. For example, the fourth end EG4O may be provided in the second sensing pattern 221, and the fourth end EG4D may face the dummy pattern 250.

When the first end EG1 and the third end EG3 are shorted with a peripheral conductive pattern, the first end EG1 and the third end EG3 may cause defects. Accordingly, the first end EG1 and the third end EG3 may have shapes different from shapes of other ends, e.g., shapes of the second ends EG2O and EG2D and the fourth ends EG4O and EG4D.

FIG. 9 shows a structure in which the second ends EG2O and EG2D have the same shape as each other and the fourth ends EG4O and EG4D have the same shape as each other. However, the present disclosure is not limited thereto. For example, either the second end EG2D or the fourth end EG4D may have substantially the same shape as that of the first end EG1. For example, when both the first sensing pattern 211 and the second sensing pattern 221 are connected to the dummy pattern 250, this may be manifested as defects. Accordingly, when one of the second end EG2D and the fourth end EG4D has substantially the same shape as that of the first end EG1, the repair process may be performed on one of the second end EG2D and the fourth end EG4D, and thus, the manufactured sensor layer 200-1 (refer to FIG. 8) may be free of defects.

Figure 10:
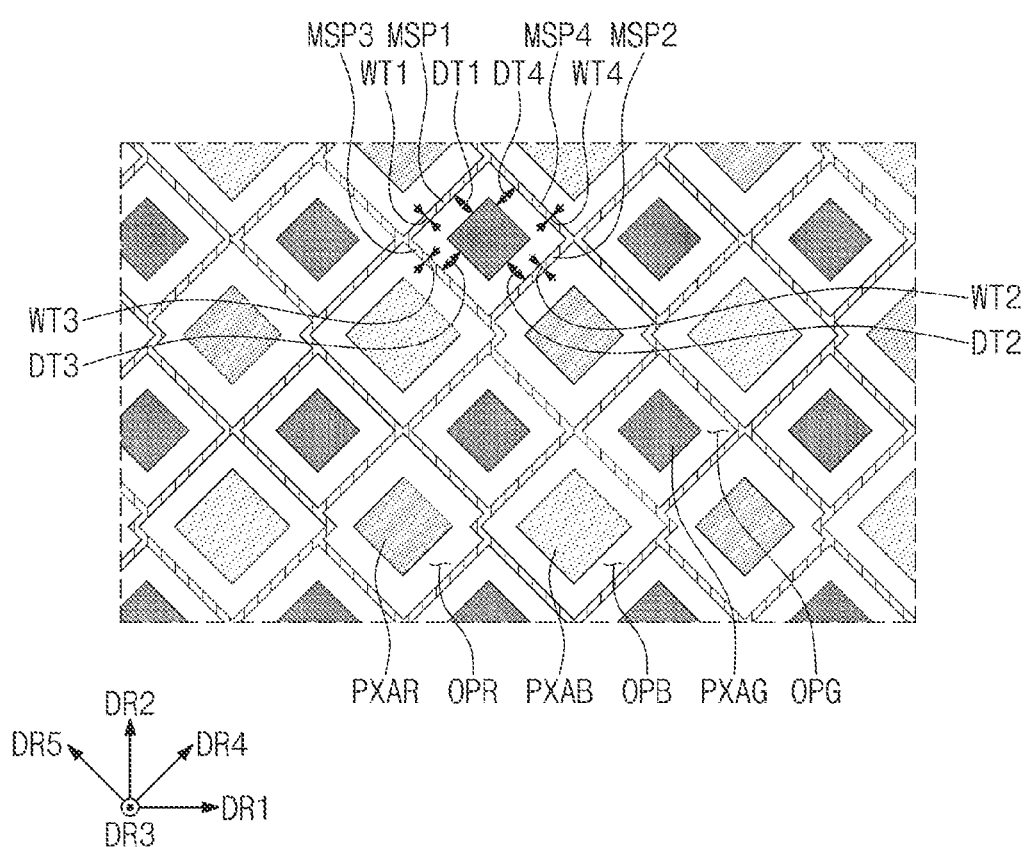
FIG. 10 is a plan view showing some components of an electronic device according to an example embodiment of the present disclosure.

FIG. 10 is a plan view showing some components of an electronic device according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure.

FIG. 10 shows portions of the light emitting area PXA (refer to FIG. 3) of the display layer 100 (refer to FIG. 3) and the first sensing pattern 211 (refer to FIG. 4) of the sensor layer 200 (refer to FIG. 4).

The light emitting area PXA (refer to FIG. 3) may be provided in plural and may include a red light emitting area PXAR, a green light emitting area PXAG, and a blue light emitting area PXAB. Each of the red light emitting area PXAR, the green light emitting area PXAG, and the blue light emitting area PXAB may be arranged in a pentile structure. The pentile structure may mean a structure as shown in FIG. 10. However, the arrangement structure of the red light emitting area PXAR, the green light emitting area PXAG, and the blue light emitting area PXAB is not limited to the structure shown in FIG. 10.

The first sensing pattern 211 (refer to FIG. 4) may have a mesh structure, and a first opening OPR overlapping the red light emitting area PXAR, a second opening OPG overlapping the green light emitting area PXAG, and a third opening OPB overlapping the blue light emitting area PXAB may be defined in the first sensing pattern 211 (refer to FIG. 4).

For example, the second opening OPG may be defined by first, second, third, and fourth mesh portions MSP1, MSP2, MSP3, and MSP4. The first mesh portion MSP1 and the second mesh portion MSP2 may be spaced apart from each other, and the third mesh portion MSP3 and the fourth mesh portion MSP4 may be spaced apart from each other. Each of the third mesh portion MSP3 and the fourth mesh portion MSP4 may be connected to the first mesh portion MSP1 and the second mesh portion MSP2.

The first mesh portion MSP1 and the second mesh portion MSP2 may be portions of the first mesh line 211M1 (refer to FIG. 5A), and the third mesh portion MSP3 and the fourth mesh portion MSP4 may be portions of the first cross-mesh line 211M2 (refer to FIG. 5A).

Widths WT1, WT2, WT3, and WT4 of the first, second, third, and fourth mesh portions MSP1, MSP2, MSP3, and MSP4 may be substantially the same as each other. In addition, distances DT1, DT2, DT3, and DT4 between the first, second, third, and fourth mesh portions MSP1, MSP2, MSP3, and MSP4 and the green light emitting area PXAG may be substantially the same as each other. The expression "widths or distances are substantially the same as each other" may mean that they are the same as each other within a range including a process error as would be understood by a person having ordinary skill in the art.

The first mesh portion MSP1 may be a portion extending along the fourth direction DR4, and the width WT1 of the first mesh portion MSP1 may be a width in a direction, e.g., the fifth direction DR5, that is substantially parallel to a direction crossing the direction in which the first mesh portion MSP1 extends. In addition, the distance DT1 between the first mesh portion MSP1 and the green light emitting area PXAG may be a distance in the direction substantially parallel to the fifth direction DR5.

Figure 11:
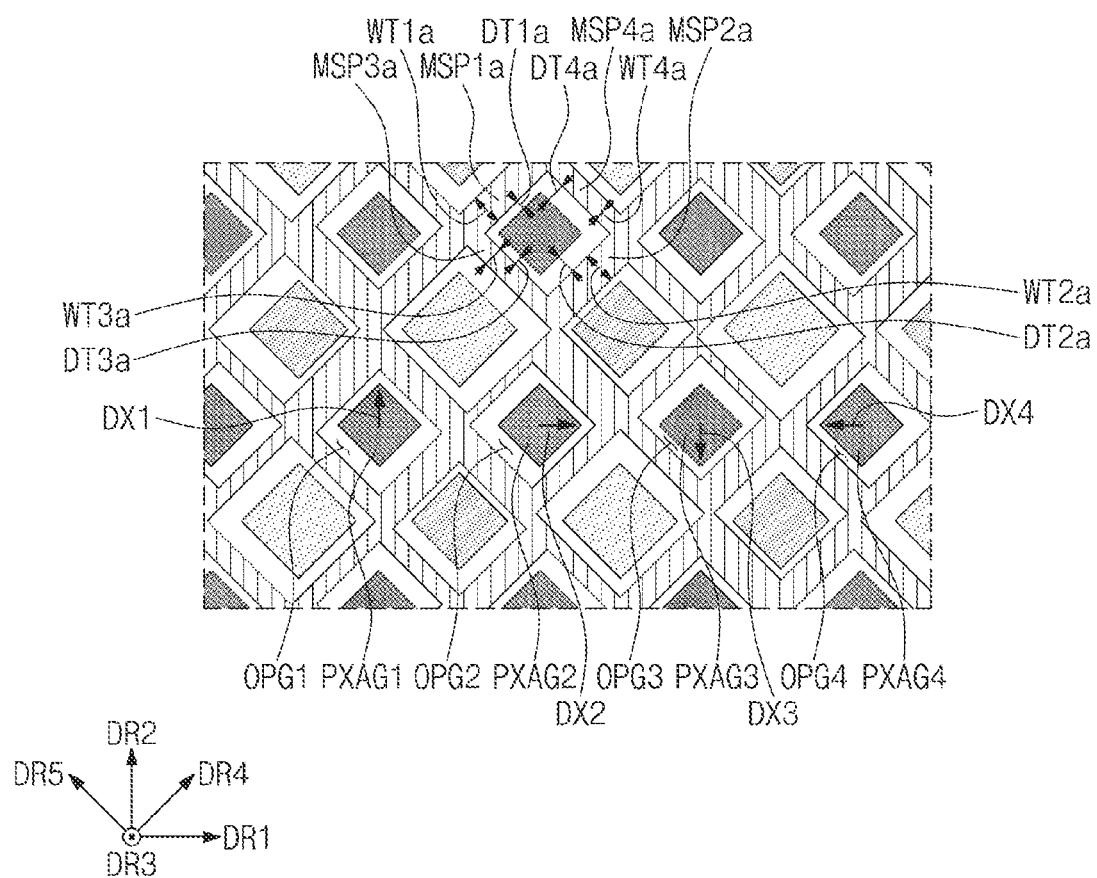
FIG. 11 is a plan view showing some components of an electronic device according to an example embodiment of the present disclosure.

FIG. 11 is a plan view showing some components of an electronic device according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure, and in describing FIG. 11, different features from those of FIG. 10 will be mainly described.

Referring to FIG. 11, the display quality of the electronic device 1000 (refer to FIG. 1) may be improved by adjusting widths WT1a, WT2a, WT3a, and WT4a of first, second, third, and fourth mesh portions MSP1a, MSP2a, MSP3a, and MSP4a and distances DT1a, DT2a, DT3a, and DT4a between the first, second, third, and fourth mesh portions MSP1a, MSP2a, MSP3a, and MSP4a and a green light emitting area PXAG, which may collectively refer to a first light emitting area PXAG1, a second light emitting area PXAG2, a third light emitting area PXAG3, and a fourth light emitting area PXAG4.

Color coordinates may be controlled by adjusting the widths WT1a, WT2a, WT3a, and WT4a and the distances DT1a, DT2a, DT3a, and DT4a, and thus, a white angle difference (WAD) characteristic may be improved. The WAD is an item to evaluate a change in white characteristic according to a viewing angle. For example, the WAD characteristic may be evaluated by measuring a luminance change amount and a color coordinate change amount according to the viewing angle with respect to a front side, which is observed in a vertical direction on a screen, for example, the third direction DR3. When the WAD characteristic is improved, the display quality of the electronic device 1000 (refer to FIG. 1) may be improved.

Some of the widths WT1a, WT2a, WT3a, and WT4a of the first, second, third, and fourth mesh portions MSP1a, MSP2a, MSP3a, and MSP4a may be different from others. For example, a first width WT1a may be greater than a third width WT3a and a fourth width WT4a, and a second width WT2a may be greater than the third width WT3a and the fourth width WT4a. In addition, some of the distances DT1a, DT2a, DT3a, and DT4a between the first, second, third, and fourth mesh portions MSP1a, MSP2a, MSP3a, and MSP4a and the green light emitting area PXAG may be different from others. For example, a first distance DT1a may be smaller than a second distance DT2a, and a third distance DT3a may be smaller than a fourth distance DT4a.

The distances DT1a, DT2a, DT3a, and DT4a in each of the light emitting area providing the same light may be adjusted differently. For example, the green light emitting area PXAG may be provided in plural, and the green light emitting area PXAG may include the first light emitting area PXAG1, the second light emitting area PXAG2, the third light emitting area PXAG3, and the fourth light emitting area PXAG4. The first, second, third, and fourth light emitting areas PXAG1, PXAG2, PXAG3, and PXAG4 may emit the same color as each other.

The first sensing pattern 211 (refer to FIG. 4) may have the mesh structure, and a first opening OPG1 overlapping the first light emitting area PXAG1, a second opening OPG2 overlapping the second light emitting area PXAG2, a third opening OPG3 overlapping the third light emitting area PXAG3, and a fourth opening OPG4 overlapping the fourth light emitting area PXAG4 may be defined in the first sensing pattern 211 (refer to FIG. 4).

A position of the first light emitting area PXAG1 with respect to the first opening OPG1 may be different from a position of the second light emitting area PXAG2 with respect to the second opening OPG2. For example, the first light emitting area PXAG1 may be positioned as being shifted in a first shift direction DX1 with respect to the first opening OPG1, the second light emitting area PXAG2 may be positioned as being shifted in a second shift direction DX2 with respect to the second opening OPG2, the third light emitting area PXAG3 may be positioned as being shifted in a third shift direction DX3 with respect to the third opening OPG3, and the fourth light emitting area PXAG4 may be positioned as being shifted in a fourth shift direction DX4 with respect to the fourth opening OPG4.

Referring to FIG. 11, each of the red light emitting area PXAR and the blue light emitting area PXAB (see FIG. 10) may be shifted similar to the green light emitting areas PXAG, and thus, a further description thereof will be omitted.

According to an example embodiment of the present disclosure, a positional relationship between the light emitting area and the opening may be provided in various and random ways. Accordingly, although a color distortion occurs in a specific direction due to process dispersion, a WAD distribution may be reduced because the positional relationship between the light emitting area and the opening is provided in various and random ways.

Figure 12:
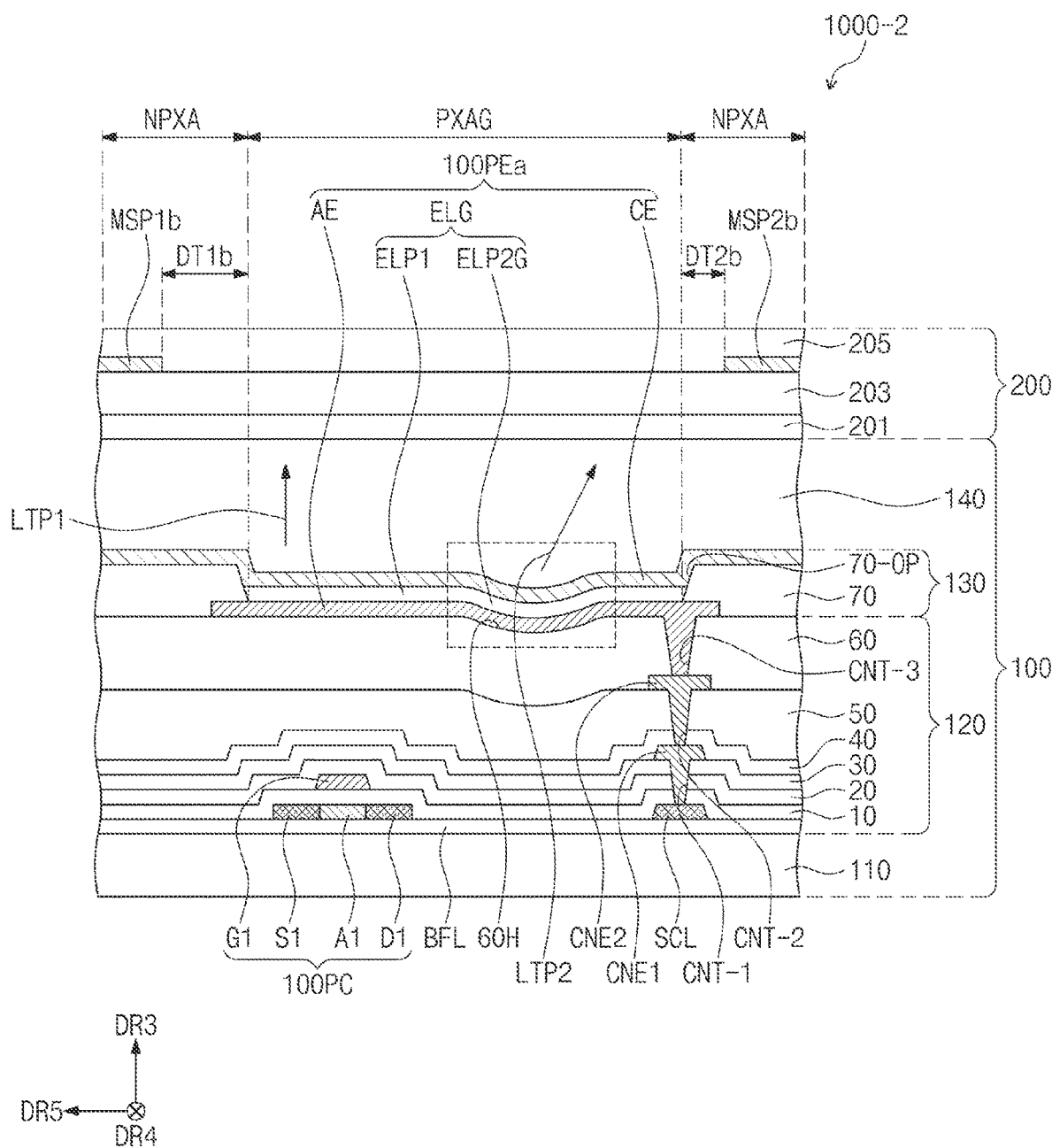
FIG. 12 is a cross-sectional view showing an electronic device according to an example embodiment of the present disclosure.
Figure 13:
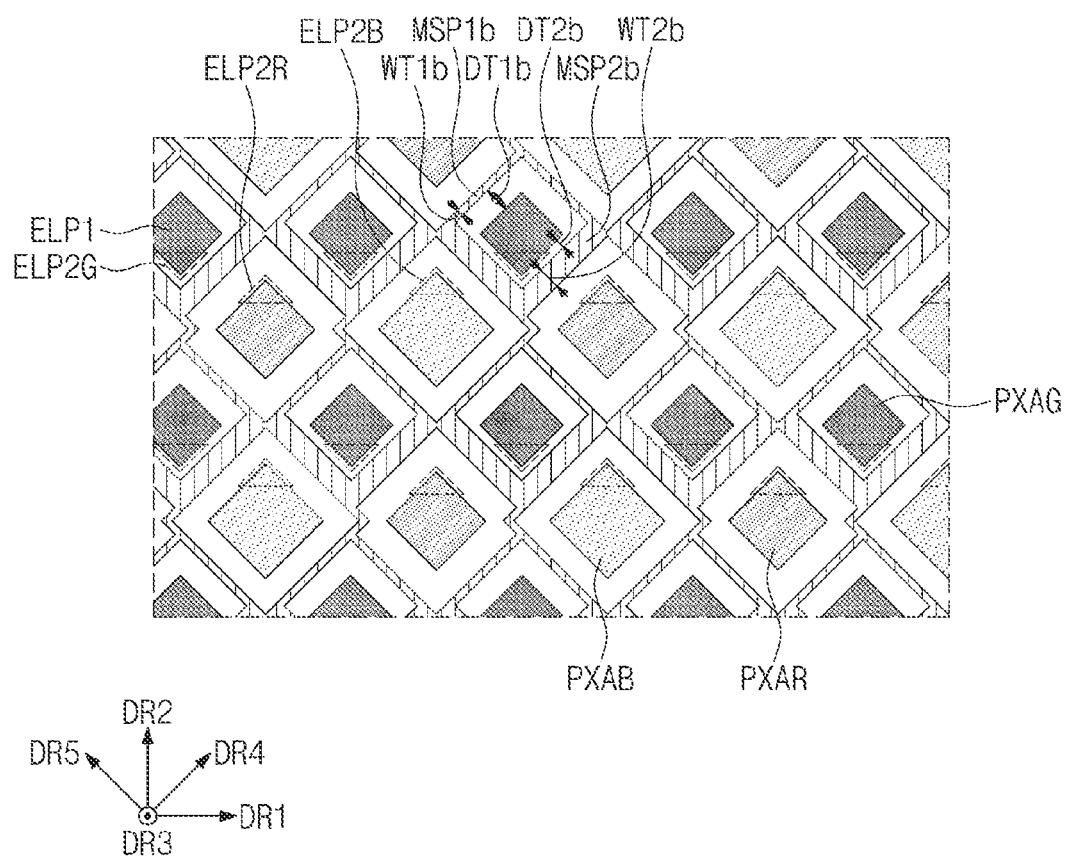
FIG. 13 is a plan view showing some components of an electronic device according to an example embodiment of the present disclosure.

FIG. 12 is a cross-sectional view showing an electronic device 1000-2 according to an example embodiment of the present disclosure, and FIG. 13 is a plan view showing some components of the electronic device according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure, and in describing FIGS. 12 and 13, different features from those of FIG. 3 will be mainly described.

Referring to FIGS. 12 and 13, a concave groove 60H may be defined in a sixth insulating layer 60 of a display layer 100 of the electronic device 1000-2. The concave groove 60H may be provided by components disposed under the sixth insulating layer 60.

A light emitting element 100PEa may include a first electrode AE, a light emitting layer ELG, and a second electrode CE. The light emitting layer ELG may include a first light emitting portion ELP1 and a second light emitting portion ELP2G.

The first light emitting portion ELP1 and the second light emitting portion ELP2G may be distinguished from each other based on their shapes in the light emitting layer ELG. For example, the first light emitting portion ELP1 may include a substantially flat upper surface, and the second light emitting portion ELP2G may include an inclined upper surface. For example, the second light emitting portion ELP2G may have a curved shape to correspond to the shape of the concave groove 60H of the sixth insulating layer 60. The second light emitting portion ELP2G may be concaved from the first light emitting portion ELP1 in a direction away from a base layer 201.

A light LTP1 emitted from the first light emitting portion ELP1 may travel in a third direction DR3, for example, in a thickness direction of the base layer 201, a thickness direction of the display layer 100, or a thickness direction of the electronic device 1000-2. A light LTP2 emitted from the second light emitting portion ELP2G may be provided in a direction inclined with respect to the third direction DR3.

When viewed in the thickness direction of the electronic device 1000-2, mesh portions MSP1b and MSP2b may be disposed around a green light emitting area PXAG. FIG. 12 shows a first mesh portion MSP1b and a second mesh portion MSP2b. The first mesh portion MSP1b may be disposed adjacent to the first light emitting portion ELP1, and the second mesh portion MSP2b may be disposed adjacent to the second light emitting portion ELP2G.

When viewed in a plane, a first distance DT1b between the first mesh portion MSP1b and the green light emitting area PXAG may be different from a second distance DT2b between the second mesh portion MSP2b and the green light emitting area PXAG. For example, the second distance DT2b may be smaller than the first distance DT1b.

According to an example embodiment of the present disclosure, the second mesh portion MSP2b disposed in an area adjacent to the inclined second light emitting portion ELP2G may be disposed closer to the green light emitting area PXAG to prevent a light from being intensively viewed in a certain direction. A width WT2b of the second mesh portion MSP2b may be adjusted to be greater than a width WT1b of the first mesh portion MSP1b. A light traveling in a certain direction, e.g., the light LTP2 traveling in a direction inclined with respect to the third direction DR3 in the second light emitting portion ELP2G, may be blocked by the second mesh portion MSP2b. Accordingly, the light LTP2 that causes the color distortion may be blocked or reduced from being emitted such that it is visible to a user, and thus, the WAD characteristic may be improved.

Referring to FIG. 13, light emitting portions ELP2R and ELP2B may be respectively defined in a red light emitting area PXAR and a blue light emitting area PXAB as the second light emitting portion ELP2G of the green light emitting area PXAG. In FIG. 13, distances between the red light emitting area PXAR and the mesh portions may be the same as each other, and distances between the blue light emitting area PXAB and the mesh portions may be the same as each other. That is, only the distances DT1b and DT2b between the green light emitting area PXAG and the mesh portions MSP1b and MSP2b may be adjusted differently from each other. For example, in an example embodiment, only a thickness of the mesh portions MSP1b and MSP2b disposed around the light emitting area that provides a light of a specific color with the best visual sensitivity characteristics may be different from each other.

Figure 14:
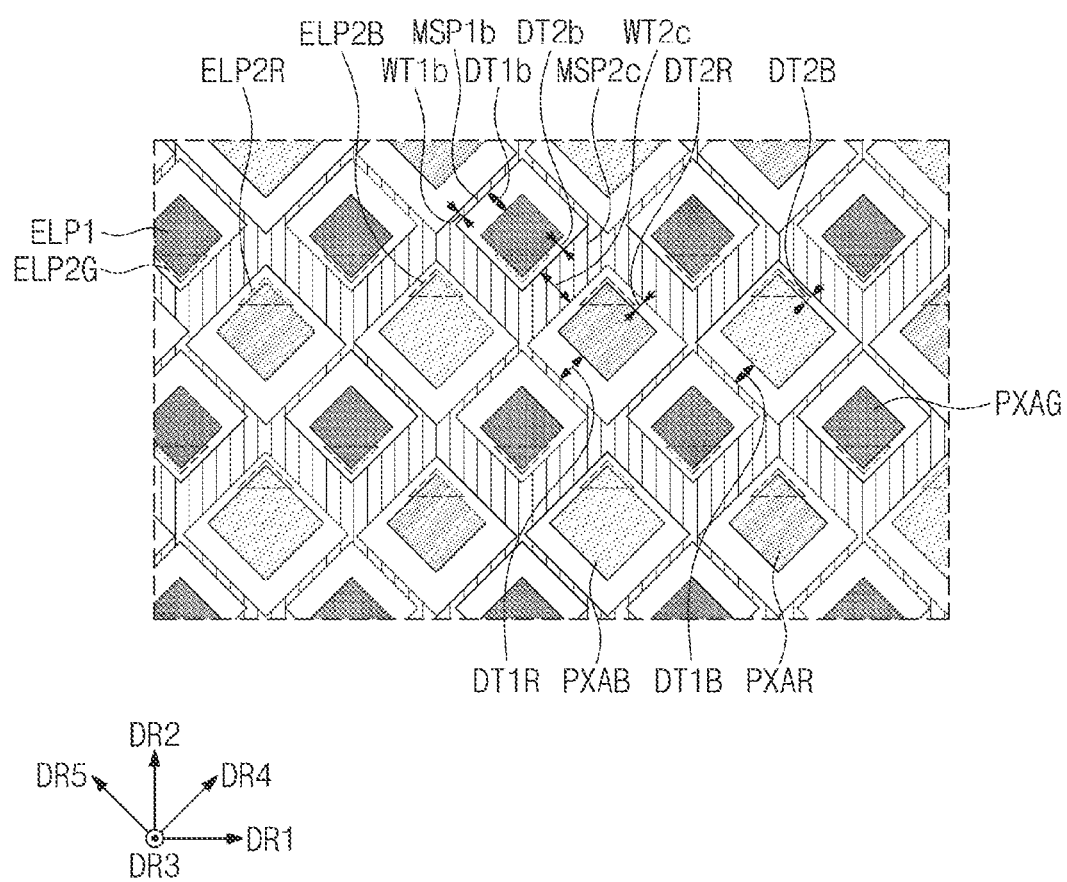
FIG. 14 is a plan view showing some components of an electronic device according to an example embodiment of the present disclosure.

FIG. 14 is a plan view showing some components of an electronic device according to an example embodiment of the present disclosure.

For convenience of explanation, to the extent that a further description of elements and technical aspects is omitted, it may be assumed that these elements and technical aspects are at least similar to corresponding elements and technical aspects that have been described elsewhere in the present disclosure, and in describing FIG. 14, different features from those of FIG. 13 will be mainly described.

Referring to FIG. 14, a width of mesh portions disposed adjacent to a red light emitting area PXAR and a blue light emitting area PXAB may be adjusted. For example, a second mesh portion MSP2c may be disposed adjacent to a second light emitting portion ELP2R of the red light emitting area PXAR. Accordingly, the second mesh portion MSP2c may be expanded in a direction to the red light emitting area PXAR. Thus, a width WT2c of the second mesh portion MSP2c may be greater than the width WT2b of the second mesh portion MSP2b of FIG. 13.

A distance DT2R between the second light emitting portion ELP2R of the red light emitting area PXAR and the mesh portion may be smaller than a distance DT1R between a first light emitting portion of the red light emitting area PXAR and the mesh portion. A distance DT2B between a second light emitting portion ELP2B of the blue light emitting area PXAB and the mesh portion may be smaller than a distance DT1B between a first light emitting portion of the blue light emitting area PXAB and the mesh portion. The first light emitting portion of the red light emitting area PXAR may mean the other area except the second light emitting portion ELP2R in the red light emitting area PXAR, and the first light emitting portion of the blue light emitting area PXAB may mean the other area except the second light emitting portion ELP2B in the blue light emitting area PXAB. The second light emitting portions ELP2R, ELP2G, and ELP2B are shown as areas surrounded by dotted lines.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. An electronic device, comprising:
   a base layer;
   a first sensing pattern disposed on the base layer and comprising a plurality of first mesh lines;
   a second sensing pattern disposed on the base layer and spaced apart from the first sensing pattern;
   a first sensing line electrically connected to the first sensing pattern; and
   a second sensing line electrically connected to the second sensing pattern,
   wherein each of the plurality of first mesh lines comprises at least one of a first end and a second end having a shape different from a shape of the first end, the first end faces the second sensing pattern, and the second end is spaced apart from the second sensing pattern.

2. The electronic device of claim 1, further comprising:
   a dummy pattern disposed on the base layer between the first sensing pattern and the second sensing pattern,
   wherein the second end is spaced apart from the second sensing pattern with the dummy pattern interposed therebetween.

3. The electronic device of claim 1, wherein the second end of one first mesh line among the plurality of first mesh lines faces another first mesh line among the plurality of first mesh lines without any conductive material disposed between the second end of the one first mesh line and the another first mesh line.

4. The electronic device of claim 1, wherein
   the first end comprises a plurality of first side edges extending substantially parallel to each other and a first connection edge connecting the plurality of first side edges,
   the second end comprises a plurality of second side edges extending substantially parallel to each other and a second connection edge connecting the plurality of second side edges, and
   the first connection edge has a length different from a length of the second connection edge.

5. The electronic device of claim 4, wherein an angle between one first side edge among the plurality of first side edges and the first connection edge is different from an angle between one second side edge among the plurality of second side edges and the second connection edge.

6. The electronic device of claim 4, wherein one edge of the first connection edge and the second connection edge is a substantially straight line, and the other edge of the first connection edge and the second connection edge is a curved line.

7. The electronic device of claim 4, wherein one edge of the first connection edge and the second connection edge comprises at least two substantially straight lines, and the other edge of the first connection edge and the second connection edge comprises one substantially straight line or one curved line.

8. The electronic device of claim 1, wherein
the second sensing pattern comprises a mesh portion, the plurality of first mesh lines extends in a first direction, the mesh portion extends in a second direction crossing the first direction, and the mesh portion faces the first end.

9. The electronic device of claim 1, wherein
the second sensing pattern comprises a plurality of second mesh lines extending in a same direction as the plurality of first mesh lines,
each of the plurality of second mesh lines comprises at least one of a third end and a fourth end having a shape different from a shape of the third end,
the third end faces the first end, and
the fourth end is spaced apart from the first sensing pattern.

10. The electronic device of claim 9, wherein the first end and the third end have a substantially same shape as each other.

11. The electronic device of claim 9, wherein the third end has a shape corresponding to the shape of the first end.

12. The electronic device of claim 1, wherein widths of the plurality of first mesh lines are substantially the same as each other.

13. The electronic device of claim 1, further comprising:
a display layer disposed under the base layer and a light emitting area defined therein,
wherein the first sensing pattern comprises an opening defined therein and overlapping the light emitting area.

14. The electronic device of claim 13, wherein
the first sensing pattern comprises a first mesh portion, a second mesh portion spaced apart from the first mesh portion, a third mesh portion connected to the first mesh portion and the second mesh portion, and a fourth mesh portion spaced apart from the third mesh portion and connected to the first and second mesh portions, and the first, second, third, and fourth mesh portions define the opening, and
the first, second, third, and fourth mesh portions are spaced apart from the light emitting area when viewed in a thickness direction of the base layer.

15. The electronic device of claim 14, wherein
the light emitting area comprises a first light emitting portion and a second light emitting portion concaved from the first light emitting portion in a direction away from the base layer, and
a width of a mesh portion adjacent to the second light emitting portion among the first, second, third, and fourth mesh portions is greater than a width of another mesh portion adjacent to the first light emitting portion among the first, second, third, and fourth mesh portions.

16. The electronic device of claim 14, wherein
the light emitting area comprises a first light emitting portion and a second light emitting portion inclined from the first light emitting portion in a direction away from the base layer, and
when viewed in the thickness direction of the base layer, a distance between a mesh portion adjacent to the second light emitting portion among the first, second, third, and fourth mesh portions and the light emitting area is smaller than a distance between another mesh portion adjacent to the first light emitting portion among the first, second, third, and fourth mesh portions and the light emitting area.

17. The electronic device of claim 13, wherein
the light emitting area comprises a first light emitting area and a second light emitting area emitting a light having a same color as a color of a light emitted from the first light emitting area,
the opening comprises a first opening surrounding the first light emitting area and a second opening surrounding the second light emitting area, and
when viewed in a thickness direction of the base layer, a position of the first light emitting area with respect to the first opening is different from a position of the second light emitting area with respect to the second opening.

18. The electronic device of claim 17, wherein the first sensing pattern further comprises:
a plurality of mesh portions that defines the first opening,
wherein a width of a portion of the plurality of mesh portions is different from a width of another portion of the plurality of mesh portions.

19. An electronic device, comprising:
a first sensing pattern comprising a first mesh pattern in which a disconnection portion is defined; and
a second sensing pattern spaced apart from the first sensing pattern and comprising a second mesh pattern,
wherein a first end of the first mesh pattern facing the second sensing pattern has a shape different from a shape of a second end of the first mesh pattern defining the disconnection portion.

20. The electronic device of claim 19, further comprising:
a dummy pattern disposed between the first sensing pattern and the second sensing pattern,
wherein a third end of the first mesh pattern facing the dummy pattern has a shape different from the shape of the first end.

21. An electronic device, comprising:
a substrate;
a display layer disposed on the substrate and comprising a first electrode, a pixel definition layer disposed on a first portion of the first electrode, a light emitting layer disposed on a second portion of the first electrode, and a second electrode disposed on the light emitting layer and the pixel definition layer,
wherein the light emitting layer comprises a first light emitting portion including a substantially flat upper surface and a second light emitting portion that protrudes in a direction from the first light emitting portion toward the substrate; and
a sensing pattern disposed on the display layer,
wherein the pixel definition layer comprises a pixel-defining opening exposing the second portion of the first electrode, wherein the sensing pattern comprises an opening defined therein corresponding to the pixel-defining opening, and a plurality of mesh portions surrounding the opening, wherein, when viewed in a thickness direction of the display layer, a distance between a first mesh portion adjacent to the first light emitting portion among the plurality of mesh portions and the second portion of the first electrode is greater than a distance between a second mesh portion adjacent to the second light emitting portion among the plurality of mesh portions and the second portion of the first electrode, and wherein an area of the second light emitting portion is smaller than an area of the first light emitting portion.

22. The electronic device of claim 21, wherein the second mesh portion has a width greater than a width of the first mesh portion.

23. The electronic device of claim 21, wherein the sensing pattern further comprises:
a first mesh line having a first end; and
a second mesh line having a second end having a shape different from the first end.

24. An electronic device, comprising:
a display layer comprising a first light emitting area, a second light emitting area spaced apart from the first light emitting area in a first direction, and a third light emitting area spaced apart from the first light emitting area in a second direction crossing the first direction; and
a sensing pattern disposed on the display layer,
wherein the first light emitting area, the second light emitting area, and the third light emitting area emit a light having a same color as each other,
wherein the sensing pattern comprises a first opening defined therein and overlapping the first light emitting area, a second opening defined therein and overlapping the second light emitting area, and a third opening defined therein and overlapping the third light emitting area,
wherein, when viewed in a thickness direction of the display layer, a position of the first light emitting area with respect to the first opening, a position of the second light emitting area with respect to the second opening, and a position of the third light emitting area with respect to the third opening are different from each other.

25. The electronic device of claim 24, wherein the sensing pattern comprises:
a plurality of mesh portions that defines the first opening, and a width of a portion of the plurality of mesh portions is different from a width of another portion of the plurality of mesh portions.

26. The electronic device of claim 24, wherein the sensing pattern comprises:
a first mesh line comprising a first end; and
a second mesh line comprising a second end having a shape different from the first end.

* * * * *